(12) United States Patent
Hosoya et al.

(10) Patent No.: US 7,952,794 B2
(45) Date of Patent: May 31, 2011

(54) IMAGE DISPLAY APPARATUS

(75) Inventors: Yukio Hosoya, Tokyo (JP); Okushi Okuyama, Tokyo (JP); Satoshi Uchino, Tokyo (JP); Hiroyuki Konno, Tokyo (JP); Kouji Shibata, Tokyo (JP); Mikio Kouyama, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/784,960

(22) Filed: May 21, 2010

(65) Prior Publication Data
US 2010/0302623 A1    Dec. 2, 2010

(30) Foreign Application Priority Data
May 27, 2009   (JP) ................... 2009-127851

(51) Int. Cl.
G02B 26/00   (2006.01)
(52) U.S. Cl. ........................ 359/296; 359/245
(58) Field of Classification Search .............. 359/296
See application file for complete search history.

(56) References Cited

U.S. PATENT DOCUMENTS
2009/0251764 A1*  10/2009  Uchino et al. ........... 359/296

FOREIGN PATENT DOCUMENTS
JP    2004029699    1/2004

* cited by examiner

Primary Examiner — Ricky L Mack
Assistant Examiner — James C Jones
(74) Attorney, Agent, or Firm — Lucas & Mercanti, LLP

(57) ABSTRACT

An image display apparatus including: two substrates at least one of which is transparent; and display particles that are sealed between the substrates in a powder state so that by generating an electric field between the substrates, the display particles are moved to display an image; wherein, of contact surfaces with the display particles in a gap between the substrates, both of the surfaces on the substrate sides have oxide layers of the same metal, and the display particles include positively chargeable display particles and negatively chargeable display particles, and both of the positively chargeable display particles and the negatively chargeable display particles have structures obtained by successively forming oxide layers of the same metal as that of the metal oxide layers possessed by the surfaces on the substrate sides and organic layers on the surfaces of base particles that contain at least a resin and a colorant.

19 Claims, 7 Drawing Sheets

Fig. 3
(a) Before voltage application
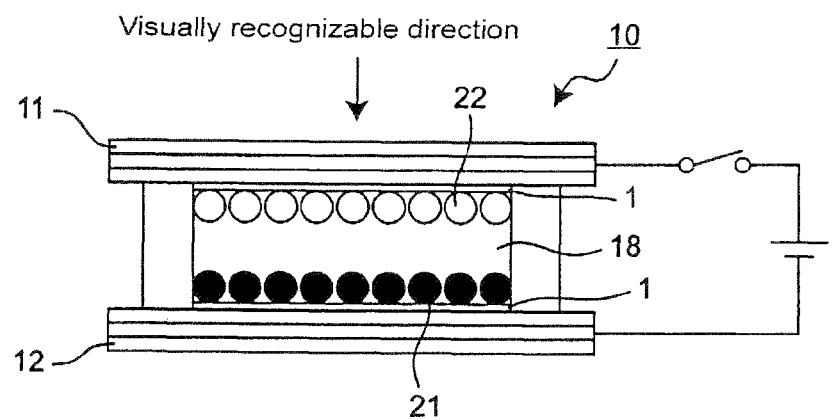
(b) After voltage application
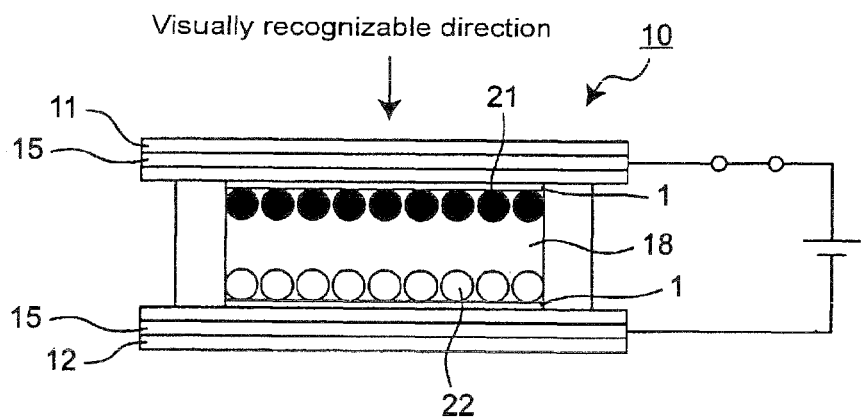

Fig. 4
(a) Before voltage application (Switch OFF)
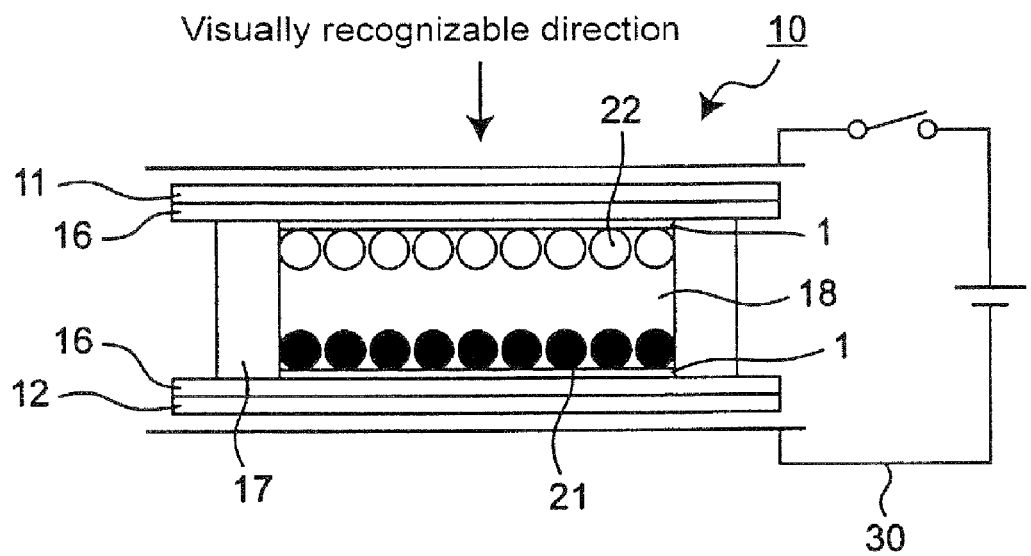
(b) After voltage application (Switch ON)
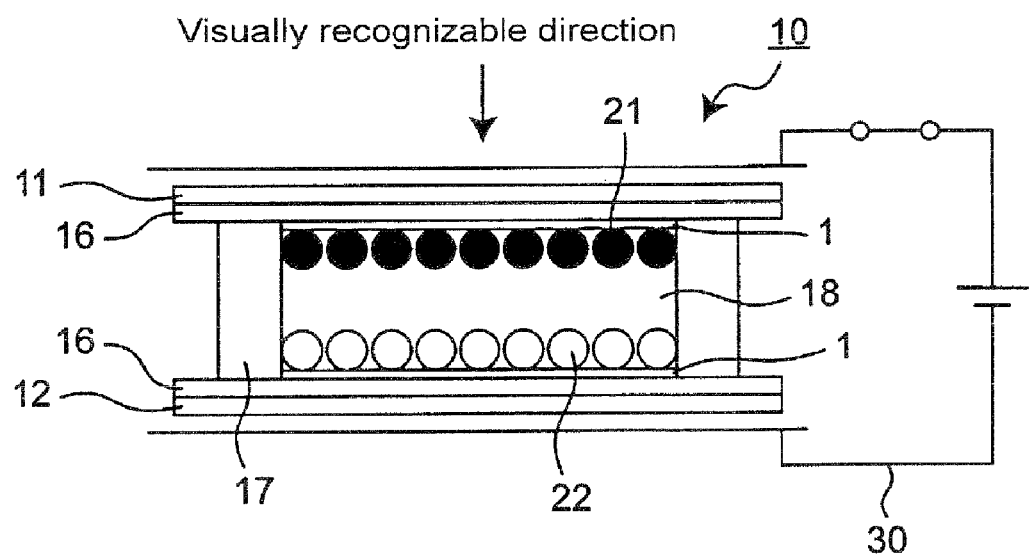

Fig. 5

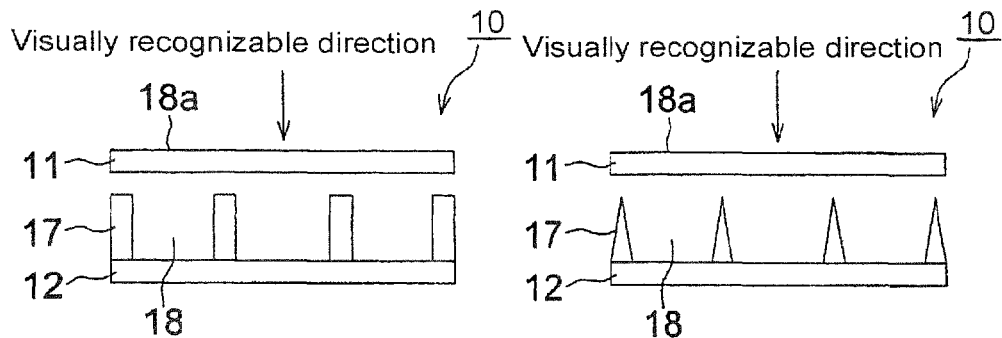

◎ Image display surface
(Base member 11 viewed in visually recognizable direction)

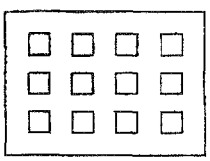
Square cell lattice-shaped configuration

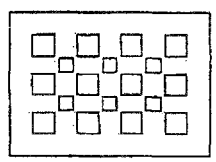
Square cell honeycomb configuration 1

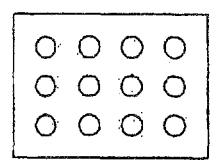
Round cell lattice-shaped configuration

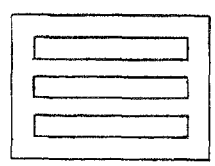
Line-shaped cell

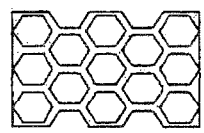
Hexagonal cell honeycomb configuration

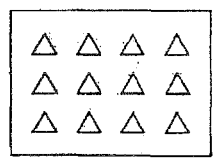
Triangular cell lattice-shaped configuration

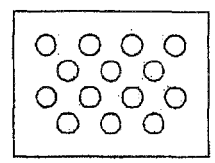
Round cell honeycomb configuration

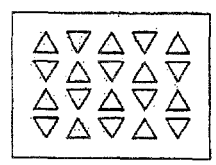
Triangular cell honeycomb configuration

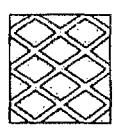
Square cell network configuration

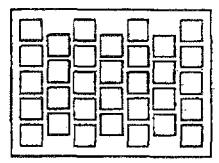
Square cell honeycomb configuration 2

Fig. 6
(a)
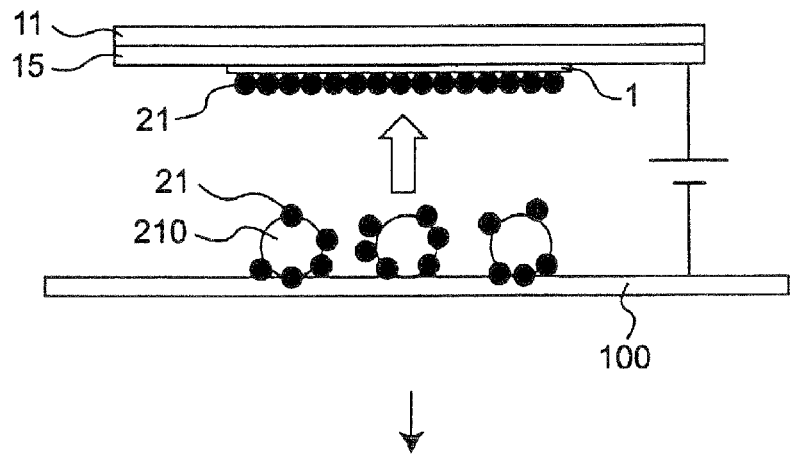
(b)
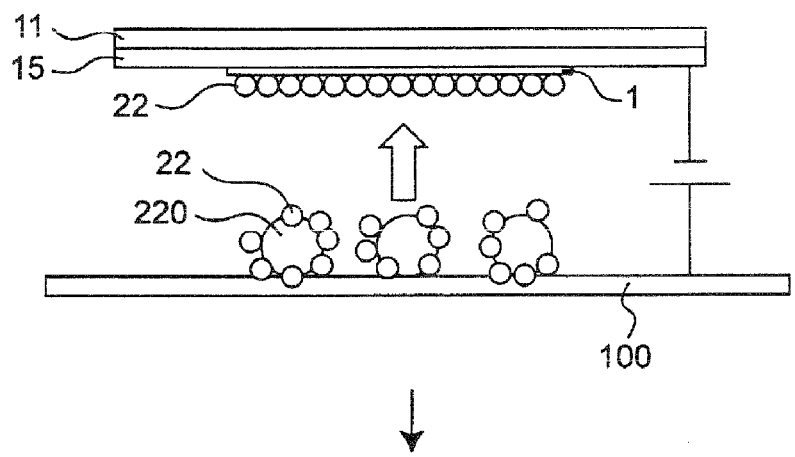
(c)
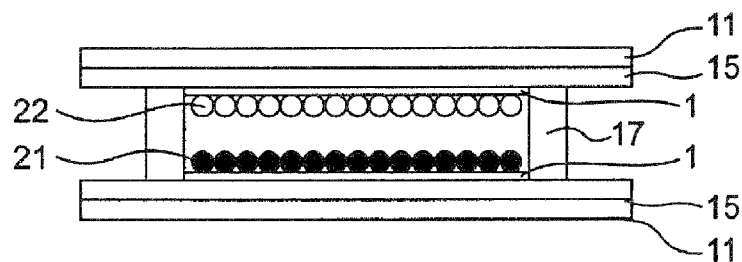

IMAGE DISPLAY APPARATUS

This application is based on application No. 2009-127851 filed in Japan, the contents of which are hereby incorporated by reference.

BACKGROUND OF THE INVENTION

1. Field of the Invention

The present invention relates to an image display apparatus that can execute displaying and erasing operations of images repeatedly by moving display particles in an electric field.

2. Description of Related Art

Conventionally, an image display apparatus that displays images by moving display particles in a gaseous phase has been known. The image display apparatus has a structure in which display particles in a powder state are sealed between two substrates at least one of which is transparent, and by generating an electric field between the substrates, the display particles are moved and adhered to one of the substrates so that an image is displayed. Upon driving such an image display apparatus, a voltage is applied between the substrates to generate an electric field, and the display particles are moved along the electric field direction so that by selecting the electric field direction on demand, the displaying and erasing operations of images can be executed repeatedly.

However, once the display particles are adhered to the substrate, the display particles become unmovable in the adhered state to the substrate since the display particles have a comparatively high adhesive force, resulting in a problem that the contrast between an image portion and a non-image portion deteriorates.

In order to reduce the adhesive force between the display particles and the substrate, display particles, formed by coating the surface of each of base particles containing a binder resin and a colorant with inorganic fine particles such as hydrophobic silica or hydrophobic titania, by using a dry mixing method by a Henschel mixer or the like, have been known (Japanese Patent-Application Laid-Open No. 2004-29699). However, since the dry mixing method fails to completely cover the surface of each base particle, the adhesive force suppressing effect by the fine particles is not sufficiently exerted. For this reason, after repetitive driving operations, the contrast between the image portion and the non-image portion is lowered.

The present inventors have found a technique in which a metal oxide layer is formed on the surface of each of base particles by using a wet synthesizing method and an organic layer is further formed thereon so that the contrast durability can be improved. In such a technique, however, although the technique provides improving effects of the contrast durability under a normal temperature-normal pressure environment, in a case of repetitive driving operations under a low temperature-low humidity environment, the absolute value of the quantity of charge of each of the display particles increases, resulting in degradation of the contrast.

It is an object of the present invention to provide an image display apparatus that can sufficiently prevent the degradation of contrast at the time of repetitive driving operations for a long period of time, even under a low temperature-low humidity environment.

SUMMARY OF THE INVENTION

The present invention relates to an image display apparatus including: two substrates at least one of which is transparent; and display particles that are sealed between the substrates in a powder state so that by generating an electric field between the substrates, the display particles are moved to display an image; wherein, of contact surfaces with the display particles in a gap between the substrates, both of the surfaces on the substrate sides have oxide layers of the same metal, and the display particles include positively chargeable display particles and negatively chargeable display particles, and both of the positively chargeable display particles and the negatively chargeable display particles have structures obtained by successively forming oxide layers of the same metal as that of the metal oxide layers possessed by the surfaces on the substrate sides and organic layers on the surfaces of base particles that contain at least a resin and a colorant.

BRIEF DESCRIPTION OF THE DRAWINGS

FIG. 3 is a schematic drawing that shows one example of movements of display particles due to a voltage application between substrates.

FIG. 4 is a schematic drawing that shows another example of movements of display particles due to a voltage application between the substrates.

FIG. 5 is a schematic drawing that shows an example of a shape of an image display surface.

FIG. 6 is a schematic drawing that shows an example of a sealing method for display particles.

DETAILED DESCRIPTION OF THE INVENTION

Image Display Apparatus

An image display apparatus of the present invention is provided with two substrates at least one of which is transparent, and display particles that are sealed between the substrates in a powder state, and displays an image by generating an electric field between the substrates so that the display particles are moved. The following description will discuss the image display apparatus of the present invention in detail. The image display apparatus of the present invention is referred to as "powder display".

Figure 1:
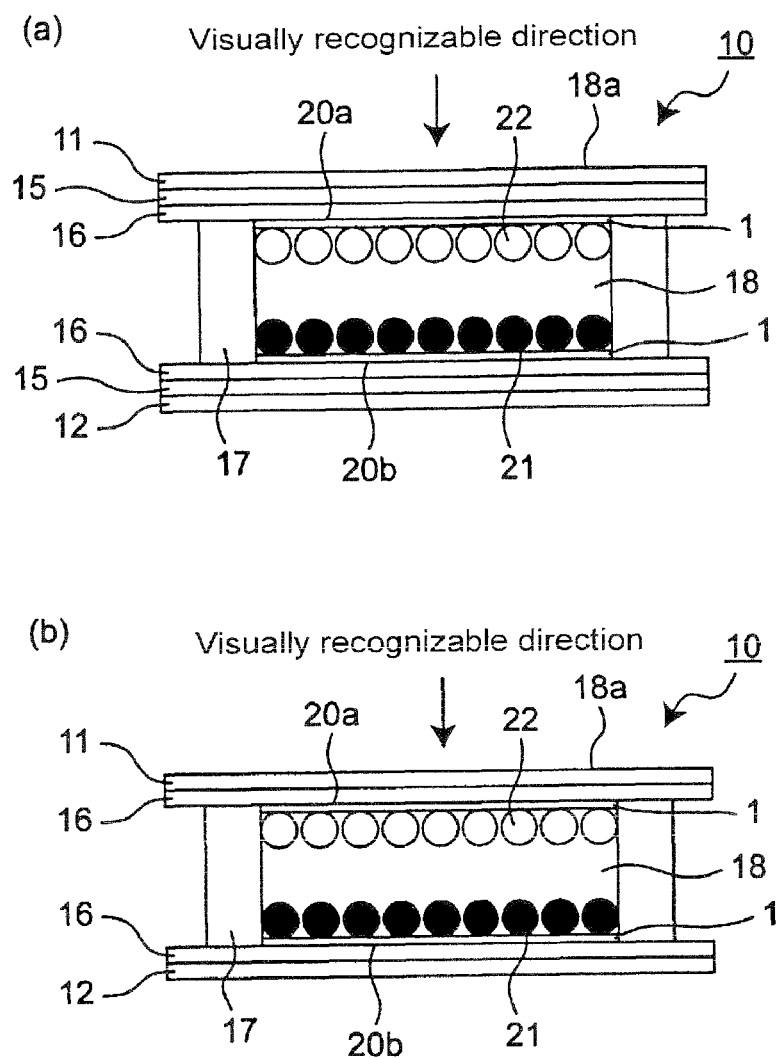
FIG. 1 is a schematic drawing that shows a cross-sectional structure of one example of an image display apparatus of the present invention.

FIG. 1 shows typical cross sections of image display apparatuses of the present invention. FIG. 1(a) shows a structure in which an electrode 15 having a layer structure is formed on each of substrates 11 and 12, with an insulating layer 16 being formed on the surface of each electrode 15. An image display apparatus shown in FIG. 1(b) has a structure in which no electrode is formed in the image display apparatus of FIG. 1(a), and is designed so that an electric field is applied by electrodes formed on the outside of the apparatus so as to move the display particles. In FIG. 1(a) and FIG. 1(b), the same reference numerals represent the same member. FIG. 1 indicates FIG. 1(a) and FIG. 1(b) in a manner to be included therein. An image display apparatus 10 of FIG. 1 is supposed to be used for viewing images from the substrate 11 side as shown in the Figure; however, the present invention is not intended to be limited by the structure in which images are viewed from the substrate 11 side. Moreover, since no electrode 15 is attached to the apparatus, the apparatus having a type shown in FIG. 1(b) can be simplified in its apparatus structure and is advantageous in that its manufacturing processes can be shortened. FIG. 4 shows a state in which the image display apparatus 10 of the type shown in FIG. 1(b) is set in a device capable of applying a voltage so that the voltage is applied thereto. The cross-sectional structure of the image display apparatus of the present invention is not intended to be limited by those shown in FIGS. 1(a) and 1(b).

On the outermost portion of the image display apparatus 10 of FIG. 1(a), two opposed substrates 11 and 12, which form a box unit forming the image display apparatus, are disposed. Electrodes 15 used for applying a voltage are formed on the respective surfaces on the opposed sides of the substrates 11 and 12, and insulating layers 16 are further formed on the respective electrodes 15. The electrode 15 and the insulating layer 16 are formed on each of the substrates 11 and 12, and display particles are located in a gap 18 that is formed by aligning the faces each having the electrode 15 and the insulating layer 16 to be made face to face with each other.

On the outermost portion of the image display apparatus 10 of FIG. 1(b) also, two opposed substrates 11 and 12, which form a box unit forming the image display apparatus, are disposed. Insulating layers 16 are formed on the respective surfaces on the opposed sides of the substrates 11 and 12. The insulating layer 16 is formed on each of the substrates 11 and 12, and display particles are located in a gap 18 that is formed by aligning the faces each having the insulating layer 16 to be made face to face with each other.

In the present invention, of contact surfaces with the display particles in the gap 18 between the substrates, both of the surfaces on the substrate sides have oxide layers of the same metal. The expression "surfaces on the substrate sides" refers to surfaces near the substrates of the contact surfaces with the display particles forming the gap 18, that is, surfaces placed virtually in parallel with the substrates, and indicates surfaces 20a and 20b in FIG. 1. Both of these surfaces 20a and 20b on the substrate sides have oxide layers 1 of the same metal.

The surfaces 20a and 20b on the substrate sides on which the metal oxide layers 1 are formed are different depending on the structure of the image display apparatus, and may be, for example, the surface of the insulating layer 16, the surface of the electrode 15, or the surface of each of the substrates 11 and 12. More specifically, for example, in a case of the image display apparatuses shown in FIGS. 1(a) and 1(b), it is on the surface of the insulating layer 16 that the metal oxide layer 1 is formed. Moreover, for example, in a case of the image display apparatus of FIG. 1(a) without the insulating layer, it is on the surface of the electrode 15 that the metal oxide layer 1 is formed. Furthermore, for example, in a case of the image display apparatus of FIG. 1(b) without the insulating layer, it is on each of the surfaces of the substrates 11 and 12 that the metal oxide layer 1 is formed.

The expression "both of the surfaces on the substrate sides have oxide layers of the same metal" means that the metal oxide layer 1 possessed by one of the surfaces on the substrate sides (for example, 20a) is an oxide layer of the same metal atom as the metal atom contained in a metal oxide layer 1 possessed by the other surface on the substrate side (for example, 20b), and these metal oxide layers 1 are preferably indicated by the same chemical formula. More preferably, the metal oxide layer 1 possessed by one of the surfaces on the substrate sides (for example, 20a) and the metal oxide layer 1 possessed by the other surface on the substrate side (for example, 20b) have the same crystal form and are formed by the same formation method. Other conditions such as the thickness and the like may be respectively selected independently. In a case where both of the surfaces of the substrate sides have oxide layers of mutually different metal atoms, the contrast durability is lowered under a low temperature-low humidity environment.

As the composition material for the metal oxide layer 1, those materials having a light transmitting property are used, and, for example, those materials that achieve a light transmitting property of 80% or more in visible light transmittance, when formed into a metal oxide layer with a predetermined thickness, are preferably used. Specific examples of preferable materials include: silicon oxide, titanium oxide, aluminum oxide, composite materials of these materials, and the like. Examples of the silicon oxide include $SiO_2$. Examples of the titanium oxide include $Ti_2O_5$, $Ti_2O_3$, $TiO_2$ and $Ti_nO_{2n-1}$ (n: an integer of 4 to 9), and $TiO_2$ is preferably used. Examples of the aluminum oxide include $Al_2O_3$.

From the viewpoint of the contrast durability under a low temperature-low humidity environment, the metal oxide layer 1 preferably is a layer substantially comprising a single metal oxide, such as, a silicon oxide, a titanium oxide or an aluminum oxide, more preferably, $SiO_2$, $TiO_2$ or $Al_2O_3$. The expression "the metal oxide layer 1 is a layer substantially comprising a single metal oxide" means that the metal oxide layer 1 is composed of one kind of metal oxide, and may contain another metal oxide and another chemical compound as impurities. The content of the impurities is normally 1000 ppm or less of the total weight.

More specifically, for example, in a case where the metal oxide layer 1 possessed by one of the surfaces on the substrate sides (for example, 20a) is a $SiO_2$ layer, a metal oxide layer 1 possessed by the other surface on the substrate side (for example, 20b) is also a $SiO_2$ layer.

Moreover, for example, in a case where the metal oxide layer 1 possessed by one of the surfaces on the substrate sides (for example, 20a) is a $TiO_2$ layer, a metal oxide layer 1 possessed by the other surface on the substrate side (for example, 20b) may be a $Ti_2O_5$ layer, a $Ti_2O_3$ layer, a $TiO_2$ layer, or a $Ti_nO_{2n-1}$ layer (n: an integer of 4 to 9), and a $TiO_2$ layer is preferably used.

Furthermore, for example, in a case where the metal oxide layer 1 possessed by one of the surfaces on the substrate sides (for example, 20a) is an $Al_2O_3$ layer, a metal oxide layer 1 possessed by the other surface on the substrate side (for example, 20b) is also an $Al_2O_3$ layer.

Although not particularly limited as long as the object of the present invention is achieved, the thickness of the metal oxide layer 1 is preferably in the range from 0.01 to 10.0 μm, more preferably from 0.1 to 5.0 μm.

The thickness of the metal oxide layer 1 is given as a value measured by a Dektak 3030 (made by SLOAN Co., Ltd.).

The metal oxide layer 1 can be formed by an atmospheric-pressure plasma processing method described later in detail.

Of the two metal oxide layers 1 possessed by both of the surfaces on the substrate sides, at least one of the surfaces of the metal oxide layers 1 may have an organic layer.

The organic layer to be formed on the surface of the metal oxide layer 1 may be prepared through processes in which a predetermined face is heated, with a hydrophobizing agent or its solution being made in contact therewith, and the resulting face is then dried.

As the hydrophobizing agent, known hydrophobizing agents may be used which have been conventionally used as hydrophobizing agents of inorganic fine particles to be externally added to display particles in the field of the display particles for image display apparatuses. Examples of the hydrophobizing agent include: a silane coupling agent, silicone oil and the like.

Specific examples of the silane coupling agent include: dimethyl dichlorosilane, hexamethyldisilazane, methacrylsilane, octylsilane and the like.

Specific examples of the silicone oil include: methylhydrogen silicone oil, carbinol-modified silicone oil, epoxy-modified silicone oil and the like. As the silicone oil, commercially available products such as KF-99, X-22-4039, KF-101, X-22-170BX (made by Shin-Etsu Chemical Co., Ltd.), FZ-3704, SF8411FLUID (made by Dow Corning Toray Co., Ltd.), may be used.

During the hydrophobizing treatment, the heating temperature and heating time are preferably 50 to 150° C. for 0.5 to 20 hours.

The concentration of the hydrophobizing agent in the processing solution is preferably 10% by volume or more.

A solvent that may be contained in the processing solution is not particularly limited, and an organic solvent can be used. Examples of such an organic solvent include tetrahydrofran, acetone, MEK, cyclohexane and toluene.

In a case where an organic layer (not shown) is formed on each of the two surfaces of the metal oxide layers 1, the composition materials for the organic layers can be respectively selected independently. In order to further improve the contrast durability under a low temperature-low humidity environment, those organic layers are preferably made from the same composition material, and more preferably have the same crystal state and are formed by the same forming method. The other conditions such as the thickness of the organic layer may be respectively selected independently.

Although not particularly limited, the thickness of the organic layer is preferably 0.1 to 50.0 nm, and more preferably 1.0 to 20.0 nm.

The thickness of the organic layer can be measured by using the same method as that for measuring the thickness of the metal oxide layer 1.

The display particles include positively chargeable display particles and negatively chargeable display particles. More specifically, those display particles that exert a positive charge property and those display particles that exert a negative charge property, when made in frictional contact with one another in a mixing process, or when made in frictional contact with a carrier serving as a charge-applying material, are used. The positively chargeable display particles and the negatively chargeable display particles are normally different from each other not only in charging polarities, but also in colors; therefore, upon generation of an electric field between the substrates in the image display apparatus, a displayed image can be visually recognizable based upon a difference in the colors between those display particles that are moved toward the surface 20a on the upstream substrate side in the visually recognizable direction and allowed to adhere thereto and those display particles that remain on the surface 20b on the downstream substrate side in the visually recognizable direction and allowed to adhere thereto. For example, one kind of positively chargeable display particles and negatively chargeable display particles may be colored into white, while the other kind thereof may be colored into black. In the image display apparatus 10 shown in FIG. 1, black display particles 21 (hereinafter, referred to as black particles) are used as the negatively chargeable display particles, and white display particles 22 (hereinafter, referred to as white particles) are used as the positively chargeable display particles.

Figure 2:
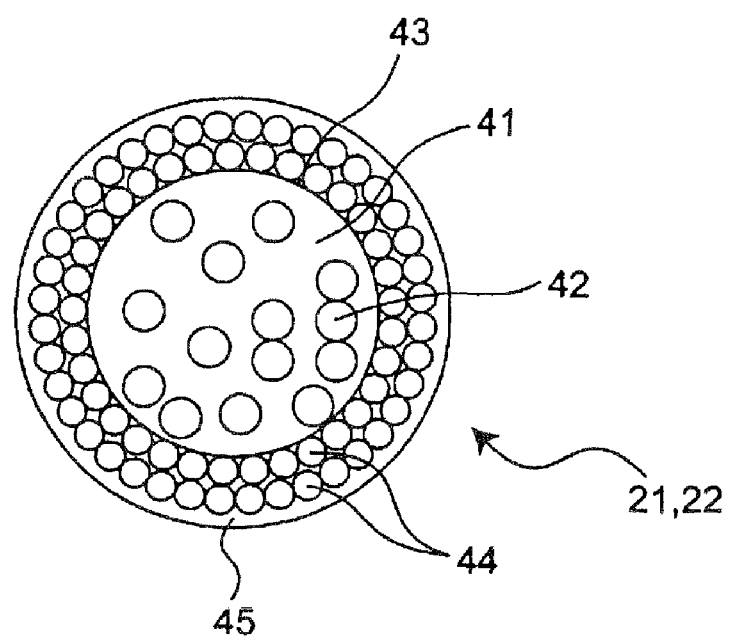
FIG. 2 is a schematic drawing that shows a cross-sectional structure of one example of a display particle used in the image display apparatus of the present invention.

Both of the positively chargeable display particles 22 and the negatively chargeable display particles 21 have a metal oxide layer and an organic layer formed on the surface of each of base particles that contain at least a resin and a colorant. More specifically, for example, as shown in FIG. 2, a metal oxide layer 44 and an organic layer 45 are successively formed on the surface of each of base particles 43 including at least a resin 41 and a colorant 42. In a case where at least one of the display particles, that is, the positively chargeable display particles or the negatively chargeable display particles, are not provided with the metal oxide layer 44 or the organic layer 45, the contrast deteriorates from the initial state under a low temperature-low humidity environment.

The metal oxide layer 44 possessed by each of the positively chargeable display particles 22 and the negatively chargeable display particles 21 is an oxide layer of the same metal as that of the metal oxide layer 1 possessed by each of the surfaces 20a and 20b on the substrate sides. The expression "the metal oxide layer 44 possessed by each of the positively chargeable display particles and the negatively chargeable display particles is an oxide layer of the same metal as that of the metal oxide layer 1" means that the metal oxide layer 44 is an oxide layer of the same metal atom as the metal atom contained in the metal oxide layer 1, and the metal oxide layer 44 and the metal oxide layer 1 are preferably indicated by the same chemical formula. The metal oxide layer 44 and the metal oxide layer 1 may have different thicknesses. In a case where the metal oxide layers 44 of the positively chargeable display particles and the negatively chargeable display particles are oxide layers of mutually different metal atoms, or oxide layers of metal atom that is different from the metal atom contained in the metal oxide layer 1, the contrast durability deteriorates under a low temperature-low humidity environment. It is considered that, since different metal atoms have different Fermi levels, a charge transfer occurs to cause an increase in the absolute value of a quantity of charge.

From the viewpoint of contrast durability under a low temperature-low humidity environment, preferably, the metal oxide layer 44 is a layer substantially comprising a single metal oxide. Specific examples of materials used for forming the metal oxide layer 44 include metal oxides that have been exemplified as the composition material for the metal oxide layer 1. The expression "the metal oxide layer 44 is a layer substantially comprising a single metal oxide" means that the metal oxide layer 44 is composed of one kind of metal oxide, and another metal oxide or another chemical compound may be contained therein as impurities. The content of the impurities is preferably 1000 ppm or less relative to the total weight.

In a case where the metal oxide layers 1 are layers substantially comprising a single metal oxide, the metal oxide layers 44 possessed by the positively chargeable display particles 22 and the negatively chargeable display particles 21 are also layers substantially comprising a single metal oxide, and the metal atom contained in the metal oxide layers 44 and the metal atom contained in the metal oxide layers 1 are the same.

More specifically, for example, in a case where the metal oxide layers 1 are silicon oxide layers, the metal oxide layer 44s of the positively chargeable display particles and the negatively chargeable display particles may be prepared as silicon oxide layers. Specifically, in a case where the metal oxide layers 1 are $SiO_2$ layers, the metal oxide layers 44 of the positively chargeable display particles and the negatively chargeable display particles are prepared as $SiO_2$ layers at the same time.

Moreover, for example, in a case where the metal oxide layers 1 are titanium oxide layers, the metal oxide layers 44 of the positively chargeable display particles and the negatively chargeable display particles may be prepared as titanium oxide layers. Specifically, in a case where the metal oxide layers 1 are $TiO_2$ layers, the metal oxide layers 44 of the positively chargeable display particles and the negatively chargeable display particles may be respectively prepared as $Ti_2O_5$ layers, $Ti_2O_3$ layers, $TiO_2$ layers, or $Ti_nO_{2n-1}$ layers (n: an integer of 4 to 9) independently, and preferably, those layers are prepared as $TiO_2$ layers at the same time.

Moreover, for example, in a case where the metal oxide layers 1 are aluminum oxide layers, the metal oxide layers 44 of the positively chargeable display particles and the negatively chargeable display particles may be prepared as aluminum oxide layers. Specifically, in a case where the metal oxide layers 1 are $Al_2O_3$ layers, the metal oxide layers 44 of the positively chargeable display particles and the negatively chargeable display particles are prepared as $Al_2O_3$ layers at the same time.

In a case where the metal oxide layers 1 are layers comprising a composite material of two or more kinds of metal oxides, the metal oxide layers 44 possessed by the positively chargeable display particles 22 and the negatively chargeable display particles 21 are also layers comprising a composite material of two or more kinds of metal oxides, with two or more kinds of the metal atoms contained in the metal oxide layers 44 and two or more kinds of the metal atoms contained in the metal oxide layers 1 being the same kinds, and the content ratios of two or more kinds of the metal atoms in the both of layers are virtually the same.

By forming the metal oxide layers 44 and the metal oxide layers 1 as oxide layers of the same metal, it becomes possible to suppress an increase of the absolute value of the quantity of charge of the display particles at the time of repetitive driving operations under a low temperature-low humidity environment, and consequently to sufficiently prevent degradation of contrast at the time of repetitive driving operations for a long period of time. The mechanism for providing such effects has not been clarified in detail; however, the following mechanism is considered to be exerted. In a case where each of the display particles is formed by successively forming the metal oxide layer 44 and the organic layer 45 on the surface of each of the base particles, electric charge generated by frictional contact is dispersed in inner directions so that the charge is maintained by the entire metal oxide layer 44. For this reason, the charge property of the display particle is greatly dependent on the metal oxide layer 44 even when the organic layer 45 is formed on the outermost surface of the display particle. In a case where the metal oxide layer 44 of the display particle and the metal oxide layers 1 on the surfaces 20a, 20b on the substrate sides are prepared as oxide layers of the same metal, since the Fermi levels of both of the layers are coincident with each other, the charge transfer between both of the layers is suppressed, with the result that the increase of the absolute value of the quantity of charge can be suppressed. Such an effect can be obtained even in the aforementioned structure in which an organic layer is further formed on the metal oxide layer 1 of each of the surfaces 20a, 20b on the substrate sides. The reason for this is presumably because, in a case where the organic layer is further formed on the metal oxide layer 1 of each of the surfaces 20a, 20b on the substrate sides, electric charge, generated by frictional charging, is dispersed in inner directions, and maintained by the surfaces 20a, 20b on the substrate sides. For this reason, in a case where the metal oxide layer 44 of the display particle and the metal oxide layers 1 on the surfaces 20a, 20b on the substrate sides are prepared as oxide layers of the same metal, since Fermi levels of both of the layers are coincident with each other, a charge transfer between both of the layers is suppressed even when the organic layer is further formed on each of the metal oxide layers 1, with the result that the increase of the absolute value of the quantity of charge can be suppressed.

The metal oxide layer 44 possessed by each of the positively chargeable display particles 22 and the metal oxide layer 44 possessed by each of the negatively chargeable display particles 21 are preferably designed to have the same crystal state and formed by the same formation method. The other conditions such as thickness may be respectively selected independently.

The thickness of the metal oxide layer 44 of each of the positively chargeable display particles 22 and the negatively chargeable display particles 21 is not particularly limited, and may be respectively, for example, 5 to 250 nm, independently, preferably 30 to 200 nm.

The thickness of the metal oxide layer 44 was measured by using a scanning-type probe microscope SPI3800N with a multi-functional unit SPA400 (made by SII-NanoTechnology Inc.).

Upon preparing a measuring sample, base particles each having the metal oxide layer 44 formed thereon were embedded with an epoxy resin, and after having been hardened at 60° C. for 24 hours, this was cut into blocks with planes by using a microtome with diamond teeth so that the block with a smoothed cross section that made it possible to observe the particle cross section was used.

The measurements were carried out by using an FS-100N (in-plane: 100 μm, vertical: 15 μm) as a scanner and an SN-AF01 made of silicon nitride (spring constant: 0.08 N/m) as a micro-cantilever, under a micro-visco-elasticity mode (VE-AFM) as its measuring mode. A shaking frequency was set to 3 to 5 kHz, and a shaking amplitude was set to 4 to 6 nm so that four screens indicating the shape image, amplitude A, Asinδ and Acosδ were measured simultaneously with each measuring area of 10 μm×10 μm, and while the metal oxide layer was confirmed through visual observations of the amplitude image, distances from the outermost surfaces of particles to base particles were measured, and the average value was calculated as the film thickness of the metal oxide layer 44. More specifically, the calculations were carried out based upon crossing points with straight lines that passed through the center of gravity of the particle, with the straight lines being set to 8 straight lines placed radially from the center of gravity with angles having equal intervals. The number of particles to be measured was at least 100 or more. Additionally, the measuring environment was set to 25° C.±5° C.

As shown in FIG. 2, the metal oxide layer 44 is normally formed from metal oxide fine particles.

The metal oxide fine particles forming the metal oxide layer 44 are preferably designed to have an average primary particle size from 5 to 250 nm, and more preferably from 30 to 200 nm from the viewpoint of uniformly coating the base particle. Such an average primary particle size of the metal oxide fine particles may be independently selected from the above-mentioned range for the positively chargeable display particles and negatively chargeable display particles respectively.

Upon measuring the average primary particle size of the metal oxide fine particles of the metal oxide layer 44, a photograph of the particles is taken by a scanning electron microscope "JSM-7410" (made by Nippon Denshi Co., Ltd.) in a magnification of 100,000 times, and with respect to 50 particles thereof, the respective maximum lengths (the maximum length between arbitrary two points on the circumference of each particle) are measured, and the number-average value thereof is defined as an average primary particle size.

The metal oxide layer 44 is formed by allowing metal oxide fine particles to be deposited on the surface of each base particle by using a wet method.

As the wet method for use in forming the metal oxide layer 44, the same method as a known wet method used for producing metal oxide fine particles may be used except that base particles are allowed to exist. For example, a sol-gel method, an interface reaction method or the like may be used.

For example, in a case where a metal oxide fine particle layer is formed on the surface of each base particle by using the sol-gel method, a predetermined metal oxide-raw material is dropped into an aqueous dispersion of the base particles under a basic environment, and the system is stirred for a predetermined period of time. Thus, base particles each having a surface on which the metal oxide fine particles are densely deposited and formed can be obtained.

As the metal oxide-raw material, in a case where a $SiO_2$ layer is formed, for example, tetraethoxysilane, tetramethoxysilane, tetraisopropoxysilane, methyltriethoxysilane, dimethyldiethoxysilane or the like may be used.

In a case where a $TiO_2$ layer is formed, for example, titanium tetraisopropoxide or the like may be used.

In a case where an $Al_2O_3$ layer is formed, for example, aluminum trimethoxide, aluminum triethoxide, aluminum triisopropoxide or the like may be used.

The organic layer 45 is formed by carrying out a surface treatment by using an organic surface treating agent. More specifically, on the base particle with the metal oxide layer 44 formed thereon, a surface treating process is carried out by using the organic surface treating agent.

As the organic surface treating agent, an organic metal compound that is used upon surface-treating inorganic fine particles serving as external additives used in the field of display particles and the like for an image display apparatus may be used, and examples thereof include: an organic silicon compound, an organic aluminum compound and an organic titanium compound. From the viewpoints of charge property and hydrophobicity, the organic silicon compound is used as a preferable organic surface treating agent. The organic metal compound is a compound containing an organic group and one or more metal atoms such as a silicon atom, an aluminum atom and a titanium atom. As the organic group possessed by the organic metal compound, for example, at least one group, selected from the group consisting of an alkyl group having 1 to 10 carbon atoms, and halogen atoms such as fluorine atoms, chlorine atoms and bromine atoms, may be used.

The organic surface treating agents for the positively chargeable display particles and the negatively chargeable display particles may be used without being particularly limited, as long as the object of the present invention can be achieved; however, normally, those are used differently depending on the charge property of display particles to be produced. For example, in a case of forming the positively chargeable display particles, a positively chargeable organic surface treating agent and a negatively chargeable organic surface treating agent are used in combination, and in a case of forming the negatively chargeable display particles, a negatively chargeable organic surface treating agent is used. The reason that the positively chargeable organic surface treating agent and the negatively chargeable organic surface treating agent are used in combination, upon forming the positively chargeable display particles, is because the positively chargeable display particles need to have positive charge property as well as a predetermined hydrophobic property. The positively chargeable organic surface treating agent is an organic metal compound that tends to give positive charge property to display particles when used for the surface treatment, and the negatively chargeable organic surface treating agent is an organic metal compound that tends to give negative charge property to display particles when used for the surface treatment.

Specific examples of the positively chargeable organic silicon compound include: aminosilane coupling agents, such as 4-aminobutyldimethylmethoxysilane, 4-aminobutyl trimethoxysilane, (aminoethylaminomethyl)phenethyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltris(2-ethylhexoxy)silane, 6-(aminohexylaminopropyl)trimethoxysilane, p-aminophenyltrimethoxysilane, aminophenyltriethoxysilane, 3-(1-aminopropoxy)3,3-dimethyl-1-propenyltrimethoxysilane, 3-aminopropyldiethylmethyl silane, 3-aminopropyltris(methoxyethoxyethoxy)silane, 3-aminopropyldimethylethexysilane, 3-aminopropylmethyldiethoxysilane, 3-aminopropyltriethoxysilane, 3-aminopropyltrimethoxysilane, 3-aminopropyltris(trimethylsiloxy)silane, ω-aminoundecyltrimethoxysilane and amino-modified silicone oil; cyclic silazanes, such as N-methyl-aza-2,2,4-trimethylsilacyclopentrane, N-aminoethyl-aza-2,2,4-trimethylsilacyclopentrane, N-n-butyl-aza-2,2-dimethoxysilacyclopentrane; and mixtures of these.

Specific examples of the negatively chargeable organic silicon compound include: organic silazanes such as hexamethyl disilazane, trimethyl disilazane, tetramethyl disilazane, hexamethylcyclo trisilazane and heptamethyl disilazane; organic siloxanes such as methylhydrogen disiloxane, dimethyldisiloxane, hexamethyl disiloxane, 1,3-divinyltetramethyl disiloxane, 1,3-diphenyltetramethyl disiloxane, methylhydrogen polysiloxane, dimethyl polysiloxane, and amino-modified siloxane; organic silane coupling agents, such as trimethylsilane, octyltrimethoxysilane, trimethylchlorosilane, trimethylethoxysilane, dimethyldichlorosilane, dichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethyldiethoxysilane, dimethyldimethoxysilane, diphenyldiethoxysilane; and mixtures of these.

Specific examples of the negatively chargeable organic aluminum compound include: organic aluminum coupling agents, such as acetoalkoxyaluminum diisopropylate and alkylacetoacetate aluminum diisopropylate; and mixtures of these.

Specific examples of the negatively chargeable organic titanium compound include: organic titanium coupling agents, such as propyltrimethoxy titanium, propyldimethoxymethyl titanium, propyltriethoxy titanium, butyltrimethoxy titanium, butyldimethoxymethyl titanium, butyltriethoxy titanium, vinyltrimethoxy titanium, vinyldimethoxymethyl titanium, vinyltriethoxy titanium, vinyldiethoxymethyl titanium, hexyltrimethoxy titanium, hexyldimethoxymethyl titanium, hexyltriethoxy titanium, hexyldiethoxymethyl titanium, phenyltrimethoxy titanium, phenyldimethoxymethyl titanium, phenyltriethoxy titanium, phenyldiethoxymethyl titanium, γ-glycidoxypropyltrimethoxy titanium, γ-glycidoxypropyldimethoxy methyl titanium, γ-glycidoxypropyltriethoxy titanium and γ-glycidoxypropyldiethoxymethyl titanium; and mixtures of these.

As the surface treatment method, the same method as a known surface treatment method for inorganic fine particles serving as external additives used in the field of display particles and the like for an image display apparatus may be used, except that base particles, each having a metal oxide layer 44 formed thereon, are used as the particles to be treated.

For example, to a dispersion of base particles, each having the metal oxide layer 44 formed thereon, an organic surface treatment agent is added, and by stirring the resulting system at room temperature or under a heating process, the treatment agent is allowed to react so that the organic layer 45 can be formed on the metal oxide layer 44. In this case, since the positively chargeable organic surface treatment agent has high hydrophilicity, it is not possible to obtain high hydrophobicity when used alone. Therefore, in the surface treatment for positively chargeable display particles, after having been treated by a positively chargeable organic surface treatment agent, the resulting particles are treated by a negatively chargeable organic surface treatment agent that provides high hydrophobicity. In a case where, after having been treated by a negatively chargeable organic surface treatment agent, the resulting particles are treated by a positively chargeable organic surface treatment agent, it is not possible to obtain a positive charge property.

Although not particularly limited, the thickness of the organic layer 45 is normally 0.1 to 50 nm, and preferably 1 to 20 nm.

The thickness of the organic layer 45 can be measured by using the same method as that for the metal oxide layer 44. That is, the distance from the outermost surface of each of the particles to the base particle was measured, and the difference between the average value thereof and the film thickness of the metal oxide layer 44 was calculated as the thickness of the organic layer.

The positively chargeable display particles and the negatively chargeable display particles are charged to a predetermined polarity, for example, by allowing them to be made in frictional contact with each other, or to be made in frictional contact with a reference material such as a carrier serving as a charge applying material. The charge polarity can be controlled by the kind of a carrier to be used for charging the positively chargeable display particles and the negatively chargeable display particles, the kinds of the resin and the charge control agent contained in the base particles, and the like, upon producing an image display apparatus.

The volume average particle size of the display particles is preferably 0.5 to 50 μm, and more preferably 1 to 20 μm. Each of the volume average particle sizes of the positively chargeable display particles and the negatively chargeable display particles is preferably in the above-mentioned range, independently.

The volume average particle size is given as a volume basis median diameter (d50 diameter), and can be measured and calculated by using a device in which a Multisizer 3 (made by Beckman Coulter, Inc.) is connected to a computer system for use in data processing.

The measuring sequence includes processes in which, after a sample (0.02 g) has been added to and adapted in 20 ml of a surfactant solution (used for dispersing particles, and formed as a surfactant solution by diluting a neutral detergent containing the surfactant component with pure water ten times as much), the resulting solution is subjected to an ultrasonic dispersing process for 1 minute so that a dispersion solution is prepared. This dispersion solution is injected into a beaker containing ISOTON II (made by Beckman Coulter, Inc.) inside a sample stand by using a pipet until it has reached a measured concentration of 10%, and by setting a measuring machine count to 2500 pieces, a measuring process is carried out. Additionally, the Multisizer 3 having its aperture diameter of 100 μm is used.

The mixing ratio between the positively chargeable display particles and the negatively chargeable display particles is preferably 1/3 to 3/1, in particular, 1/2 to 2/1 in weight ratio.

The display particles of the present invention, that is, the positively chargeable display particles and the negatively chargeable display particles, may be used, with external additives known in the field of display particles for the image display apparatus added thereto. As the external additives, examples thereof include inorganic fine particles such as silica, titania and alumina, and organic fine particles such as those made from polyacrylic resin, melamine resin and polystyrene resin. The average primary particle size of the external additives is 5 to 250 nm, and preferably 10 to 150 nm.

Although not particularly limited as long as sealed display particles are allowed to move, and set in a range capable of maintaining the contrast, the thickness of the gap 18 is normally in a range from 10 μm to 500 μm, and preferably from 10 μm to 200 μm. The volume-filling-ratio of the display particles within the gap 18 is 5% to 70%, and preferably 10% to 60%. By setting the volume-filling-ratio of the display particles within the above-mentioned range, the display particles in the gap 18 are allowed to move smoothly, and it becomes possible to obtain an image with superior contrast.

Next, the following description will discuss behaviors of display particles in the gap 18 of the image display apparatus 10.

In the image display apparatus of the present invention, upon application of a voltage between the two substrates so that an electric field is formed therein, display particles located between the substrates are allowed to move in the electric field direction. In this manner, by applying a voltage between the substrates where the display particles are located, the display particles are allowed to move between the substrates so that an image displaying operation is carried out.

The image displaying operation in the image display apparatus of the present invention is carried out through the following sequence of processes.

(1) Display particles to be used as display media are charged by using a known method such as frictional charging by using a carrier or the like.
(2) The display particles are sealed between two opposed substrates, and in this state, a voltage is applied between the substrates.
(3) By the voltage application between the substrates, an electric field is formed between the substrates.
(4) The display particles are attracted toward the substrate surfaces in the electric field direction on the side opposite to the polarity of the display particles by a function of a force of the electric field between the electrodes so that an image displaying operation is carried out.
(5) Moreover, by changing the electric field direction between the substrates, the moving directions of the display particles are switched. By switching the moving directions, it is possible to change the image display in various ways.

As the charging method of display particles by the above-mentioned known method, for example, a method is proposed in which the display particles are made in contact with the carrier so as to charge them by frictional charging, and another method is proposed in which display particles of two colors having different chargeabilities are mixed and stirred by a shaker so that the display particles are charged by frictional charging among the particles. In the present invention, the carrier is used, and the charged display particles are preferably sealed between the substrates.

FIGS. 3 and 4 show examples of movements of display particles in response to a voltage application between the substrates.

FIG. 3(a) shows a state prior to the voltage application between substrates 11 and 12, and prior to the voltage application, white particles 22 positively charged are located near the substrate 11 on the visible side. This state shows that the image display apparatus 10 displays a white image. Moreover, FIG. 3(b) shows a state after the voltage application to the electrode 15 in which black particles 21, negatively charged by a voltage application, have been moved close to the substrate 11 on the visible side, while the white particles 22 have been moved to the substrate 12 side. In this state, the image display apparatus 10 displays a black image.

FIGS. 4 show a structure in which the image display apparatus 10 shown in FIG. 1(b) of a type without electrodes is connected to a voltage application device 30, and also show a state prior to a voltage application in this state (FIG. 4(a)) and a state after the voltage application (FIG. 4(b)). In the same manner as in the image display apparatus 10 having the electrode 15, the image display apparatus 10 of the type shown in FIG. 1(b) also has a state in which black particles 21, negatively charged by the voltage application, have been moved close to the substrate 11 on the visible side, while the white particles 22 positively charged have been moved to the substrate 12 side.

The following description will discuss substrates 11 and 12, an electrode 15, an insulating layer 16 and barrier ribs 17 that constitute the image display apparatus 10 shown in FIG. 1.

First, the substrates 11 and 12 forming the image display apparatus 10 will be described. In the image display apparatus 10, since the viewer visually recognizes an image formed by the display particles from at least one of the sides of the substrates 11 and 12, the substrate to be placed on the visible side by the viewer needs to be formed by a transparent material. Therefore, the substrate to be used on the image visible side by the viewer is preferably formed by a light-transmitting material having a visible light transmittance of 80% or more, and the visible light transmittance of 80% or more makes it possible to provide sufficient visibility. Of the substrates forming the image display apparatus 10, the substrate to be placed on the side opposite to the image visible side is not necessarily made from a transparent material.

The thicknesses of the substrates 11 and 12 are preferably 2 μm to 5 mm, and more preferably 5 μm to 2 mm, respectively. When the thicknesses of the substrates 11 and 12 are within the above-mentioned range, it is possible to allow the image display apparatus 10 to have sufficient strength, with the gap between the substrates being maintained uniformly. Moreover, by setting the thicknesses of the substrates within the above-mentioned range, a compact, light-weight image display apparatus can be provided so that the application of the image display apparatus can be promoted in a wider field. Moreover, by setting the thickness of the substrate on the image visible side within the above-mentioned range, it is possible to provide accurate visual recognition of a displayed image and consequently to prevent problems with display quality.

As the material having a visible light transmittance of 80% or more, examples thereof include an inorganic material such as glass and quartz, having no flexibility, an organic material typically represented by a resin material, which will be described later, and a metal sheet. Among these, the organic material and the metal sheet allow the image display apparatus to have a certain degree of flexibility. As the resin material capable of providing a visible light transmittance of 80% or more, for example, polyester resins, typically represented by polyethylene terephthalate and polyethylene naphthalate, polycarbonate resin, polyether sulfone resin, polyimide resin and the like may be used. Moreover, transparent resins, obtained by radical-polymerizing a vinyl-based polymerizable monomer, such as acrylic resin that is a polymer of acrylic acid esters and methacrylic acid esters, typically represented by polymethyl methacrylate (PMMA) or polyethylene resin, may be used.

The electrodes 15 are formed on the surfaces of the substrates 11 and 12, and used for forming an electric field between the substrates, that is, in the gap 18, by applying a voltage. In the same manner as in the aforementioned substrates, the electrode 15 to be formed on the image visible side to the viewer needs to be formed by using a transparent material.

The thickness of the electrode to be formed on the image visible side needs to be set to such a level as to ensure conductivity and also to avoid problems with light-transmitting property, and more specifically, it is preferably 3 nm to 1 μm, and more preferably 5 nm to 400 nm. Moreover, the visible light transmittance of the electrode to be formed on the image visible side is preferably 80% or more, in the same manner as that of the substrate. The thickness of the electrode to be placed on the side opposite to the image visible side is preferably within the above-mentioned range, but the electrode is not required to be made from a transparent material.

As the constituent material for the electrodes 15, examples thereof include: a metal material and a conductive metal oxide, or a conductive polymer material. Specific examples of the metal material include: aluminum, silver, nickel, copper, gold and the like, and specific examples of the conductive metal oxide include: indium-tin oxide (ITO), indium oxide, antimony-tin oxide (ATO), tin oxide, zinc oxide and the like. Moreover, examples of the conductive polymer material include: polyaniline, polypyrrole, polythiophene, polyacetylene, and the like.

As the method for forming the electrode 15 on the substrates 11 and 12, for example, in the case of forming a thin-film electrode, a sputtering method, a vacuum vapor deposition method, a chemical vapor deposition method (CVD method) and a coating method are proposed. Moreover, another method may be proposed in which a conductive material is mixed in a solvent and a binder resin and this mixture is applied to a substrate so as to form an electrode.

The insulating layer 16 has such a structure as to support a metal oxide layer 1 thereon; however, the insulating layer 16 is not necessarily required to be installed.

As the material for forming the insulating layer 16, such a material that has an electrical insulating property, can be formed into a thin film, and also has a transparent property, if necessary, is preferably used. The insulating layer to be formed on the image visible side is preferably designed to have a visible light transmittance of 80% or more in the same manner as in the substrate. Specific examples thereof include: a polyamide resin, a silicone resin, an epoxy resin, a polyester resin, a polycarbonate resin, an acrylic resin and the like.

The thickness of the insulating layer 16 is preferably 0.01 μm or more to 10.0 μm or less. That is, when the thickness of the insulating layer 16 is within the above-mentioned range, it is possible to move the display particles 21, 22 without the necessity of applying a high voltage between the electrodes, and this structure is preferable because, for example, an image displaying process can be carried out by applying a voltage in such a level as to be applied during an image forming process by the use of an electrophoretic method.

The barrier rib 17 is used for ensuring the gap 18 between the substrates, and as shown on the right side and left side in the upper stage of FIG. 5, these may be formed not only on the edge portion of the substrate 11, 12, but also inside thereof, if necessary. The width of the barrier rib 17, in particular, the thickness of the barrier rib on the image display surface 18a side, is preferably made as thin as possible from the viewpoint of ensuring clearness of a displayed image, as shown on the right side in the upper stage of FIG. 5.

The barrier rib 17 to be formed inside of the substrate 11, 12 may be formed continuously, or may be formed intermittently, in a direction from the surface to the rear face, as shown on the right side and left side in the upper stage of FIG. 5.

By controlling the shape and configuration of the barrier ribs 17, the cell of the gap 18 divided by the barrier ribs 17 can be placed with various shapes. Examples of the shape and configuration of the cells at the time when the gap 18 is viewed in the visually recognizable direction of the substrate 11 are shown in the lower stage of FIG. 5. As shown in the lower stage of FIG. 5, by using a square shape, a triangular shape, a line shape, a round shape, a hexagonal shape or the like, a plurality of ribs can be disposed into a honeycomb shape and a network shape.

The barrier ribs 17 can be formed by carrying out a shaping process on the substrate on the side opposite to the image-recognizing side, for example, by using the following method. As the method for shaping the barrier ribs 17, for example, a method for forming concavity and convexity by using an embossing process and a thermal press injection molding process to be carried out on a resin material or the like, a photolithography method, a screen printing method and the like are proposed.

Base Particles

The base particles forming the display particles are colored resin particles that contain at least a resin and a colorant, and may further contain additives such as a charge control agent and a fluorescent whitening agent, if necessary. With respect to the base particles, normally, colorants having different colors are contained between those base particles contained in the positively chargeable display particles and those base particles contained in the negatively chargeable display particles. For example, white base particles and black base particles are used in combination.

The resin for forming base particles is not particularly limited, but typically includes a polymer referred to as a vinyl-based resin, as shown below, and in addition to the vinyl-based resin, a condensation-based resin such as a polyimide resin, a polyester resin, a polycarbonate resin and an epoxy resin may be used. In addition to a polystyrene resin, a polyacrylic resin and polymethacrylic resin, specific examples of the vinyl-based resin include a polyolefin resin formed by an ethylene monomer and a propylene monomer, or the like. Moreover, as resins other than the vinyl-based resin, in addition to the above-mentioned condensation-based resin, for example, a polyether resin, a polysulfone resin, a polyurethane resin, a fluorine-based resin, a silicone-based resin or the like may be used.

As the polymer for forming the resin used for forming the base particles, in addition to those obtained by using at least one kind of polymerizable monomers forming these resins, a plurality of kinds of polymerizable monomers may be combined and used for the polymer. Upon forming a resin by combining a plurality of kinds of polymerizable monomers with one another, in addition to methods in which a copolymer such as a block copolymer, a graft copolymer and a random copolymer, is formed, a polymer blending method in which a plurality of kinds of resins are mixed with one another may be used.

By selecting a resin, the charging polarity of the display particles may be controlled.

As the colorant, not particularly limited, known pigments in the field of the display particles for the image display apparatus may be used. Among these, as a white pigment for forming the white base particles, for example, zinc oxide (zinc white), titanium oxide, antimony white, zinc sulfide, barium titanate, calcium titanate and strontium titanate may be used, and among these, titanium oxide is preferably used. Moreover, as a black pigment for forming the black base particles, for example, carbon black, copper oxide, manganese dioxide, aniline black, activated carbon or the like may be used, and among these, carbon black is preferably used. Although not particularly limited, the content of the colorant is, for example, 1 to 200 parts by weight relative to 100 parts by weight of the resin.

As the charge control agent, not particularly limited, known charge control agents in the field of the display particles for the image display apparatus may be used. Among these, the base particles containing a negative charge control agent, such as a salicylic acid metal complex, a metal-containing azo dye, a quaternary ammonium salt compound, nitroimidazole derivatives and the like, tend to be negatively charged. Moreover, the base particles containing a positive charge control agent, such as a nigrosine-based dye, a triphenylmethane compound, imidazole derivatives and the like, tend to be positively charged. Although not particularly limited, the content of the charge control agent may be, for example, 0.1 to 10 parts by weight relative to 100 parts by weight of the resin.

As the method for manufacturing the base particles, not particularly limited, known methods for manufacturing particles containing a resin and a colorant, such as a method for manufacturing a toner to be used for image formation in an electrophotographic system, may be adopted and used. As a specific method for manufacturing the base particles, for example, the following methods may be used.

(1) After kneading a resin and a colorant, the resulting matter is subjected to respective pulverizing and classifying processes so that base particles are formed;

(2) A polymerizable monomer and a colorant are mechanically stirred in an aqueous medium to form droplets, and these are then subjected to a polymerizing process to form base particles, which is a so-called suspension polymerization method;

(3) A polymerizable monomer is dropped into an aqueous medium in which a surfactant is contained, and after this has been subjected to a polymerizing reaction in a micelle so that polymer particles in a range of 100 to 150 nm are formed, colorant particles and a coagulating agent are then added thereto so that these particles are aggregated and fused to produce base particles, which is a so-called emulsion polymerization-aggregation method.

Method for Manufacturing Image Display Apparatus

The image display apparatus can be manufactured by an electrophotographic developing system as described below.

An electrode 15 and an insulating layer 16, if necessary, are formed on each of two substrates 11 and 12 so that a pair of substrates with electrodes formed thereon are obtained. A metal oxide layer 1 is further formed thereon by using the following method.

By mixing the display particles 21 and a carrier 210, the display particles 21 are negatively charged, and the mixtures (21, 210) are placed on a conductive stage 100 as shown in FIG. 6(a), and one of the substrates with the electrodes on which the metal oxide layer 1 has been formed is placed with a predetermined gap being set from the stage 100. Next, as shown in FIG. 6(a), a DC voltage having a positive polarity and an AC voltage are applied to the electrode 15 so that negatively chargeable display particles 21 are allowed to adhere onto the metal oxide layer 1.

By mixing the display particles 22 and a carrier 220, the display particles 22 are positively charged, and the mixtures (22, 220) are placed on the conductive stage 100, as shown in FIG. 6(*b*), and the other substrate with electrodes on which the metal oxide layer 1 has been formed is placed with a predetermined gap being set from the stage 100. Next, as shown in FIG. 6(*b*), a DC voltage having a negative polarity and an AC voltage are applied to the electrode 15 so that positively chargeable display particles 22 are allowed to adhere onto the metal oxide layer 1. The substrate with electrodes to which negatively chargeable display particles have been adhered and the substrate with electrodes to which positively chargeable display particles have been adhered are superposed as shown in FIG. 6(*c*) by adjusting the barrier rib so as to form a predetermined gap, and the peripheral portions of the substrates are bonded so that an image display apparatus can be obtained.

As the carrier 210 used for negatively charging the display particles, for example, a coat-type carrier formed by coating magnetic particles such as ferrite with a resin such as a cyclohexylmethacrylate resin is effectively used.

As the carrier 220 used for positively charging display particles, for example, a coat-type carrier formed by coating magnetic particles such as ferrite with a resin such as a fluoridated acrylate resin is effectively used.

Method for Forming Metal Oxide Layer 1

The metal oxide layer may be formed by using an atmospheric-pressure plasma processing method.

In the atmospheric-pressure plasma processing method, under the atmospheric pressure or the vicinity thereof, a gas containing a metal oxide layer forming gas is supplied to a plasma discharging space, and by applying a high-frequency electric field to the discharging space, the gas is exited so that by exposing a base member to the excited gas, a metal oxide layer is formed on the base member. In this case, the base member corresponds to a substrate having a surface on which the metal oxide layer 1 is formed, and an electrode and/or an insulating layer may be formed thereon on demand. The metal oxide layer forming surface of such a substrate is exposed to the excited gas so that a predetermined metal oxide layer may be formed.

Figure 7:
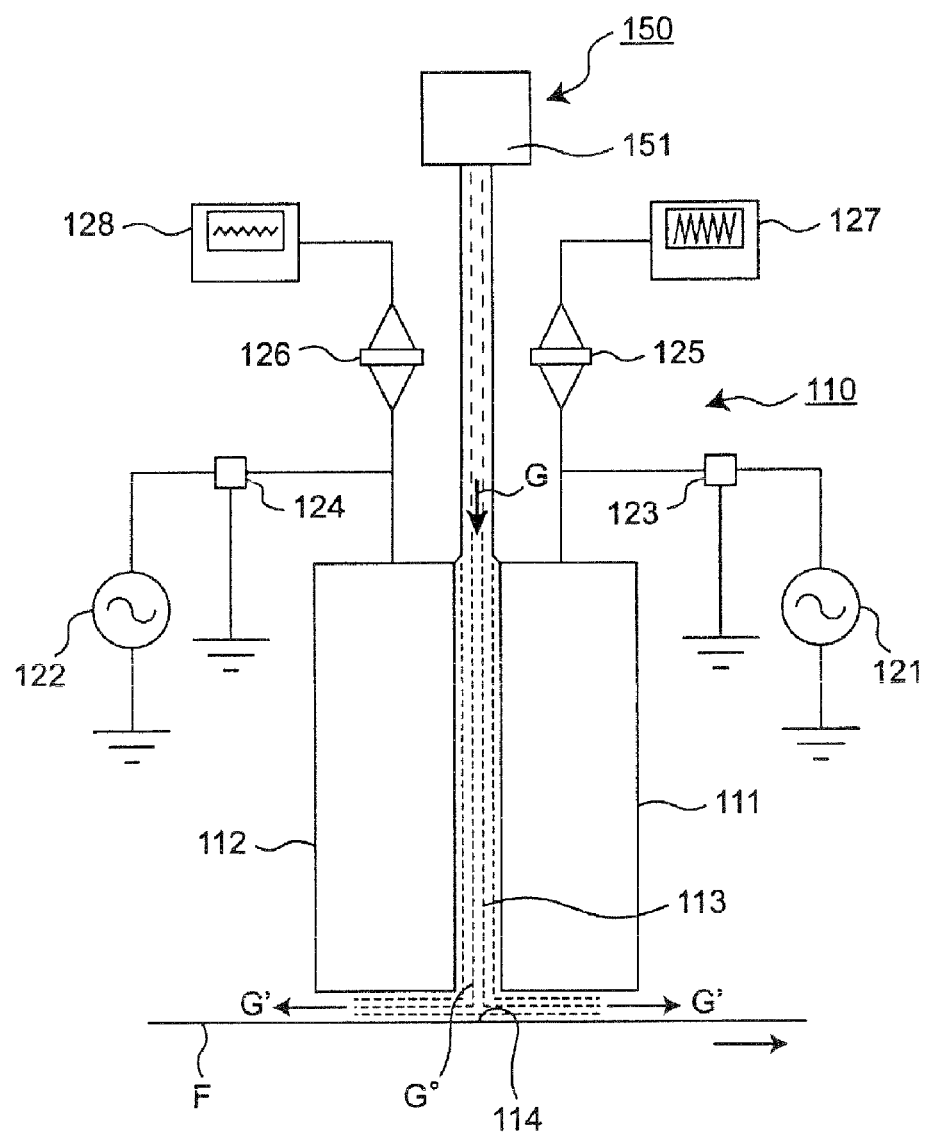
FIG. 7 is a schematic drawing that shows an example of a metal oxide layer manufacturing device of a jet system effectively used for the present invention.

Referring to FIG. 7, such an atmospheric-pressure plasma processing method (hereinafter, referred to simply as a plasma processing method) will be discussed in detail. FIG. 7 is a schematic drawing that shows one example of a metal oxide layer forming device of a jet system that uses the atmospheric-pressure plasma processing method, and is effectively used for the present invention. The metal oxide layer forming device of a jet system is a device having a plasma discharge processing device 110 and a gas supply means 150.

The plasma discharge processing device 110 is provided with opposed electrodes composed of a first electrode 111 and a second electrode 112, and between the opposed electrodes, a first high frequency electric field having a frequency $\omega_1$, an electric field intensity $V_1$ and an electric current $I_1$ from the first power supply 121 is applied from the first electrode 111 and a second high frequency electric field having a frequency $\omega_2$, an electric field intensity $V_2$ and an electric current $I_2$ from the second power supply 122 is applied from the second electrode 112. The first power supply 121 can apply a high frequency electric field intensity ($V_1 > V_2$) that is higher than that of the second power supply 122, and the first frequency $\omega_1$ of the first power supply 121 corresponds to a frequency lower than the second frequency $\omega_2$ of the second power supply 122.

A first filter 123 is installed between the first electrode 111 and the first power supply 121 so that an electric current is allowed to pass from the first power supply 121 to the first electrode 111 more easily, while an electric current from the second power supply 122 is earthed and designed to hardly pass from the second power supply 122 to the first power supply 121. The expression "to hardly pass" refers to the fact that preferably, only an electric current of 20% or less, more preferably, only an electric current of 10% or less, is allowed to pass. In contrast, the expression "to easily pass" refers to the fact that preferably, an electric current of 80% or more, more preferably, an electric current of 90% or more, is allowed to pass.

A second filter 124 is installed between the second electrode 112 and the second power supply 122 so that an electric current is allowed to pass from the second power supply 122 to the second electrode 112 more easily, while an electric current from the first power supply 121 is earthed and designed so that an electric current hardly passes from the first power supply 121 to the second power supply 122.

Upon manufacturing a metal oxide layer, a gas G generated by a gas generation device 151 of the gas supply means 150 is introduced between the opposed electrodes (discharging space) 113 of the first electrode 111 and the second electrode 112, and a high-frequency electric field is applied thereto from the first electrode 111 and the second electrode 112 to generate a discharge, while the gas G in its plasma state is blown in a jet state to the lower side (lower side of paper face) of the opposed electrodes, so that a processing space formed by the lower face of the opposed electrode and a base member F is filled with a gas G° in the plasma state; thus, a predetermined metal oxide layer is formed on the base member F in the vicinity of a processing position 114. The base member F may be set still, or may be transported. During the metal oxide layer formation, a medium is allowed to pass through a pipe from an electrode temperature adjusting means (not shown) to heat or cool the electrodes. In some cases, depending on the temperature of the base member during the plasma discharging process, physical properties, compositions and the like of the resulting metal oxide layer tend to be changed, and these should be desirably controlled on demand. As the medium for the temperature adjustment, an insulating material such as distilled water, oil or the like is preferably used. Upon carrying out the plasma discharging process, it is preferable to uniformly adjust the temperature inside the electrode so as to minimize lack in uniformity of temperature in the base member in the width direction or in the longitudinal direction as little as possible.

The plasma discharging process is carried out under the atmospheric pressure or a pressure in the proximity thereof, and the atmospheric pressure or the pressure in the proximity thereof corresponds to a level from about 20 kPa to 110 kPa, and more preferably from 93 kPa to 104 kPa.

The discharging conditions are set so that in a discharging space, the first high-frequency electric field and the second high-frequency electric field are superposed, with the frequency $\omega_2$ of the second high-frequency electric field being made higher than the frequency $\omega_1$ of the first high-frequency electric field, while the first high-frequency electric field intensity $V_1$, the second high-frequency electric field intensity $V_2$ and the intensity IV of the discharging initial electric field being allowed to satisfy the following relationship, with the output density of the second high-frequency electric field being 1 W/cm² or more:

$$V_1 \geq V > V_2 \text{ or } V_1 > IV \geq V_2$$

The high frequency refers to a frequency of at least 0.5 kHz. When both of the high-frequency electric fields to be superposed are sine waves, the superposed component between the frequency $\omega_1$ of the first high-frequency electric field and the frequency $\omega_2$ of the second high-frequency electric field higher than the frequency $\omega_1$ is formed, and its waveform becomes a saw-shaped waveform formed by superposing the sine wave of the higher frequency $\omega_2$ on the sine wave of the frequency $\omega_1$.

The intensity of the discharging initial electric field refers to the lowest electric field intensity capable of exerting a discharge in a discharging space (the structure or the like of the electrode) and reaction conditions (gas conditions and the like) to be used for actually forming the metal oxide layer. The discharging initial electric field intensity is slightly fluctuated by the kind of a gas to be supplied to the discharging space, the kind of the dielectric member of the electrode, or the distance between the electrodes; however, it is dependent on the discharging initial electric field intensity of the discharge gas in the same discharge space.

In the present specification, the high-frequency electric field intensity (applied electric field intensity) and the discharging initial electric field intensity are measured by the following method.

Method for measuring high-frequency electric field intensities $V_1$ and $V_2$ (unit: kV/mm):

A high-frequency voltage probe (P6015A) is installed on each of the electrodes, and the output signal of the high-frequency voltage probe is connected to an oscilloscope (TDS3012B: made by Tektronix, Inc.) so that the electric field intensity is measured.

Method for measuring the discharging initial electric field intensity IV (unit: kV/mm):

A discharge gas is supplied between the electrodes, and by increasing the electric field intensity between the electrodes, the electric field intensity at the time when the discharge is started is defined as a discharging initial electric intensity IV. The measuring devices are the same as those used in the high-frequency electric field intensity measurements.

FIG. 7 shows the positional relationship between the high-frequency voltage probe and the oscilloscope used for the above-mentioned measurements. In FIG. 7, reference numerals 125 and 126 represent high-frequency voltage probes, and reference numerals 127 and 128 represent oscilloscopes.

The above description has discussed superposing processes of continuous waves such as sine waves; however, the present invention is not intended to be limited thereby, but both of them may be pulse waves, or one of them may be a continuous wave, and the other may be a pulse wave. Moreover, a third electric field may be prepared.

As the frequency of the first power supply 121, frequency of 200 kHz or less is preferably used. The electric-field waveform may be a continuous wave, or a pulse wave. The lower limit is preferably about 1 kHz.

As the frequency of the second power supply 122, a frequency of 800 kHz or more is preferably used. As the frequency of the second power supply becomes higher, the plasma density becomes higher so that a fine, high-quality metal oxide layer can be obtained. The upper limit is preferably about 200 MHz.

The electric current is preferably set so as to satisfy $I_1 < I_2$. The electric current $I_1$ of the first high-frequency electric field is preferably in a range from 0.3 mA/cm² to 20 mA/cm², and more preferably from 1.0 mA/cm² to 20 mA/cm². Moreover, the electric current $I_2$ of the second high-frequency electric field is preferably in a range from 10 mA/cm² to 100 mA/cm², and more preferably from 20 mA/cm² to 100 mA/cm².

As the first filter 123, capacitors of several 10 pF to several tens of thousands pF, or coils of about several μH may be used depending on the frequency of the second power supply.

As the second filter 124, coils of 10 μH or more may be used depending on the frequency of the first power supply, and grounding is provided through these coils or capacitors so that a filter can be prepared.

As the first power supply (high-frequency power supply) 121, the following commercial products are proposed, and any of these may be used.

| Application Power-Supply Symbol | Maker | Frequency | Product Name |
| --- | --- | --- | --- |
| A1 | Sinfonia Technology Co., Ltd. | 3 kHz | SPG3-4500 |
| A2 | Sinfonia Technology Co., Ltd. | 5 kHz | SPG5-4500 |
| A3 | Kasuga Electric Works Ltd. | 15 kHz | AGI-023 |
| A4 | Sinfonia Technology Co., Ltd. | 50 kHz | SPG50-4500 |
| A5 | Haiden Laboratory Co., Ltd. | 100 kHz* | PHF-6k |
| A6 | Pearl Kogyo Co., Ltd. | 200 kHz | CF-2000-200k |
| A7 | Pearl Kogyo Co., Ltd. | 400 kHz | CF-2000-400k |

As the second power supply 122 (high-frequency power supply), the following commercial products are proposed, and any of these may be preferably used.

| Application Power-Supply Symbol | Maker | Frequency | Product Name |
| --- | --- | --- | --- |
| B1 | Pearl Kogyo Co., Ltd. | 800 kHz | CF-2000-800k |
| B2 | Pearl Kogyo Co., Ltd. | 2 MHz | CF-2000-2M |
| B3 | Pearl Kogyo Co., Ltd. | 13.56 MHz | CF-5000-13M |
| B4 | Pearl Kogyo Co., Ltd. | 27 MHz | CF-2000-27M |
| B5 | Pearl Kogyo Co., Ltd. | 150 MHz | CF-2000-150M |

Among the above-mentioned power supplies, the power supply indicated by symbol* is an impulse high-frequency power supply (100 kHz in continuous mode) made by Haiden Laboratory Co., Ltd. Those power supplies other than this are high-frequency power supplies to which only the continuous sine wave is applicable.

As the power to be applied between the opposed electrodes, a power (output density) of 1 W/cm² or more is supplied to the second electrode 112 (second high-frequency electric field) so that a discharge gas is excited to generate plasma and give the energy to the metal oxide layer forming gas in order to form a metal oxide layer. The upper limit value of the power to be supplied to the second electrode is preferably 50 W/cm$^2$, and more preferably 20 W/cm$^2$. The lower limit value thereof is preferably 1.2 W/cm$^2$. Additionally, the discharge area (cm$^2$) refers to the area of a range in which a discharge is exerted by the electrodes.

By also supplying a power (output density) of 1 W/cm$^2$ or more to the first electrode 111 (first high-frequency electric field), it is possible to improve the output density with the uniformity of the second high-frequency electric field being maintained. Thus, it becomes possible to generate uniform plasma with higher density, and also to simultaneously improve the film-forming rate and the film quality. Preferably, it is 5 W/cm$^2$ or more. The upper limit value of power to be supplied to the first electrode is preferably 50 W/cm$^2$.

The electrode to be used for manufacturing a metal oxide layer by the use of such atmospheric-pressure plasma needs to withstand severe conditions from both of structural and functional points of view. As such an electrode, one obtained by coating a metal base member with a dielectric material is preferably used.

With respect to the dielectric-material coated electrode, among those metal base members and dielectric materials, those having well-matched characteristics are preferably combined, and, for example, one preferable combination exerts a characteristic in which a difference in linear thermal expansion coefficients between the metal base member and the dielectric material is 10×10$^{-6}$/° C. or less. More preferably, it is 8×10$^{-6}$/° C. or less, most preferably 5×10$^{-6}$/° C. or less and by far the most preferably 2×10$^{-6}$/° C. or less. The linear thermal expansion coefficient refers to a widely-known physical property value which is inherent to a material.

With respect to the combination between the conductive metal base member and the dielectric member having a difference in linear thermal expansion coefficients within this range, the following combinations are proposed:

1: The metal base member is made from pure titanium or a titanium alloy, and the dielectric member is a ceramic flame spray coating film.
2: The metal base member is made from pure titanium or a titanium alloy, and the dielectric member is a glass lining film.
3: The metal base member is made from stainless steel, and the dielectric member is a ceramic flame spray coating film.
4: The metal base member is made from stainless steel, and the dielectric member is a glass lining film.
5: The metal base member is made from a composite material of a ceramic material and iron, and the dielectric member is a ceramic flame spray coating film.
6: The metal base member is made from a composite material of a ceramic material and iron, and the dielectric member is a glass lining film.
7: The metal base member is made from a composite material of a ceramic material and aluminum, and the dielectric member is a ceramic flame spray coating film.
8: The metal base member is made from a composite material of a ceramic material and aluminum and the dielectric member is a glass lining film. From the viewpoint of a difference in linear thermal expansion coefficients, the above-mentioned item 1 or 2 and items 5 to 8 are preferably used, and in particular, item 1 is more preferably used.

With respect to the characteristic required for the dielectric member, more specifically, inorganic compounds having a specific dielectric constant in a range from 6 to 45 are preferably used. Examples of such dielectric members include ceramic materials such as alumina and silicon nitride, or glass lining materials, such as silicate-based glass and borate-based glass. Among these, those materials formed by subjecting a ceramic material to a flame spray coating process or to a glass lining process are preferably used. In particular, a dielectric member which is formed by subjecting alumina to a flame spray coating process is preferably used.

As another preferable specification capable of withstanding large electric power, the thickness of the dielectric member is in a range from 0.5 to 2 mm. The variation in film thickness is preferably 5% or less, more preferably 3% or less, and most preferably 1% or less.

In a case where the dielectric member is formed on one of the electrodes, the distance between the electrodes, that is, between the first electrode 111 and the second electrode 112 opposed to each other, refers to the shortest distance of the distance between the dielectric member surface and the surface of the conductive metal base member of the other electrode. In a case where dielectric members are formed on both of the electrodes, the distance refers to the shortest distance of the distance between the mutual dielectric member surfaces. The distance between the electrodes is determined by taking into consideration factors such as the thickness of the dielectric member formed on the conductive metal base member, the size of the applied electric-field intensity, the purpose of utilizing plasma and the like, and in any of these cases, from the viewpoint of carrying out a uniform discharging process, it is preferably 0.1 to 20 mm, and more preferably 0.5 to 2 mm.

The gas G to be supplied to the discharge space contains at least a discharge gas and a metal oxide layer forming gas. The discharge gas and the metal oxide layer forming gas may be supplied in a mixed manner, or may be supplied in a separate manner. The gas to be supplied to the discharge space may contain a reactive gas that accelerates a reaction for forming the metal oxide layer, if necessary.

The discharge gas refers to a gas capable of exerting a glow discharge that can form a metal oxide layer. Examples of the discharge gas include nitrogen, a rare gas, air and the like, and these may be used alone as a discharge gas, or may be used in a mixed manner. In the present invention, a gas preferably used as the discharge gas is nitrogen. The nitrogen gas is preferably allowed to occupy 50 to 100% by volume of the discharge gas. In this case, a rare gas of less than 50% by volume is preferably contained therein as a discharge gas other than nitrogen. Moreover, the amount of the discharge gas is preferably 70 to 99.9% by volume relative to the total amount of the gas to be supplied to the discharge space.

The metal oxide layer forming gas refers to a raw material gas that excites itself in a discharge space to form a plasma state, and is chemically deposited on the base member to form a metal oxide layer, and this gas is selected on demand depending on kinds of a compound to constitute the metal oxide layer. As the raw material for the metal oxide layer forming gas, an organic metal compound which is a gas or a liquid at normal temperature, in particular, such as an alkyl metal compound, a metal alkoxide compound and an organic metal complex compound, is used. The phase state at a normal temperature under normal pressure of the raw material is not necessarily limited to a gaseous phase, and either the liquid phase or the solid phase may be used as long as the materials can be evaporated through fusion, evaporation, sublimation or the like by a heating process or a pressure reducing process in the gas generation device 151.

As the metal oxide layer forming gas, for example, a silicon compound, a titanium compound, an aluminum compound or the like may be used. For example, when the silicon compound is used, a silicon oxide layer is formed. Moreover, for example, when the titanium compound is used, a titanium oxide layer is formed. For example, when the aluminum compound is used, an aluminum oxide layer is formed.

Specific examples of the silicon compound include: silane, tetramethoxysilane, tetraethoxysilane (TEOS), tetra n-propoxysilane, tetraisopropoxysilane, tetra n-butoxysilane, tetra t-butoxysilane, dimethyldimethoxysilane, dimethyldiethoxysilane, diethyldimethoxysilane, diphenyldimethoxysilane, methyltriethoxysilane, ethyltrimethoxysilane, phenyltriethoxysilane, (3,3,3-trifluoropropyl)trimethoxysilane, hexamethyldisiloxane, bis(dimethylamino)dimethylsilane, bis(dimethylamino)methylvinylsilane, bis(ethylamino)dimethylsilane, N,O-bis(trimethylsilyl)acetamide, bis(trimethylsilyl)carbodiimide, diethylaminotrimethylsilane, dimethylaminodimethylsilane, hexamethyldisilazane, hexamethylcyclotrisilazane, heptamethyldisilazane, nonamethyltrisilazane, octamethylcyclotetrasilazane, tetracisdimethylaminosilane, tetraisocyanatesilane, tetramethyldisilazane, tris(dimethylamino)silane, triethoxyfluorosilane, allyldimethylsilane, allyltrimethylsilane, benzyltrimethylsilane, bis(trimethylsilyl)acetylene, 1,4-bistrimethylsilyl-1,3-butadiyne, di-t-butylsilane, 1,3-disilabutane, bis(trimethylsilyl)methane, cyclopentadienyltrimethylsilane, phenyldimethylsilane, phenyltrimethylsilane, propagyltrimethylsilane, tetramethylsilane, trimethylsilylacetylene, 1-(trimethylsilyl)-1-propyne, tris(trimethylsilyl)methane, tris(trimethylsilyl)silane, vinyltrimethylsilane, hexamethyldisilane, octamethylcyclotetrasiloxane, tetramethylcyclotetrasiloxane, hexamethylcyclotetrasiloxane, M silicate 51 and the like; but not limited thereto.

Specific examples of the titanium compound include: organic titanium compounds such as tetradimethylaminotitanium, titanium hydrogen compounds such as monotitanium and dititanium, titanium halogen compounds such as titanium dichloride, titanium trichloride and titanium tetrachloride, and titanium alkoxides such as tetraethoxy titanium, tetraisopropoxy titanium and tetrabutoxy titanium; but not limited thereto.

Specific examples of the aluminum compound include: aluminum n-butoxide, aluminum s-butoxide, aluminum t-butoxide, aluminum diisopropoxide ethylacetoacetate, aluminum ethoxide, aluminum hexafluoropentanedionate, aluminum isopropoxide, 4-pentadionate and dimethyl aluminum chloride; but not limited thereto.

One of these raw materials may be used alone, or two or more kinds of these may be mixed and used, depending on the kind of a metal oxide layer to be formed.

With respect to the metal oxide layer forming gas, from the viewpoint of forming a uniform metal oxide layer on the base member by using a discharge plasma process, the content thereof relative to the entire gas is preferably in a range from 0.01 to 10% by volume, and more preferably from 0.01 to 5% by volume.

As the reactive gas, for example, oxygen, ozone, hydrogen peroxide, carbon dioxide, carbon monoxide, hydrogen, ammonia and the like may be used, and oxygen, carbon monoxide and hydrogen are preferably used, and some components selected from them may be preferably mixed and used. The content thereof is preferably 0.01 to 30% by volume to the entire amount of the gas; thus, the reaction is accelerated so that a fine, good-quality metal oxide layer can be formed.

EXAMPLE

Example 1

Production of Black Display Particles

Black Base Particles

The following resin and carbon black were loaded into a Henschel mixer (made by Mitsui Miike Mining Co., Ltd.) and a peripheral speed of stirring blades was set to 25 m/s so that a mixing process was carried out for five minutes to provide a mixture.

| | |
|---|---|
| Styrene acrylic resin (weight average molecular weight 20,000) | 100 parts by weight |
| Carbon black (average primary particle size: 25 nm) | 10 parts by weight |

The above-mentioned mixture was kneaded by a twin-screw extrusion kneader, coarsely pulverized by a hummer mill, then subjected to a grinding process by a turbo-mill grinder (made by Turbo Kogyo Co., Ltd.), and further subjected to a fine-particle classifying process by a gas-flow classifier utilizing a Coanda effect so that black base particles having a volume-average particle size of 8.2 μm were produced.

Metal Oxide Layer

The black base particles (30 g) were dispersed in 1000 g of pure water, and 10 g of ammonia water (28 wt %) was added thereto, and this was stirred for 5 minutes. Next, tetraethoxysilane (8.5 g) was dropped thereto in 3 hours, and this was stirred for 5 hours at room temperature. The resulting precipitate was filtrated, and after having been washed with pure water, this was dried at 60° C. for 24 hours so that black particles in which a silica fine particle layer ($SiO_2$ layer) was formed on the surface of each of the black base particles were obtained.

Organic Layer

The black particles thus obtained (10 g) were added to a mixed solution of 50 g of cyclohexane and 10 g of hexamethyldisilazane, and this dispersion was heated to 50° C., while being stirred, so as to react with each other for 3 hours. Next, the solvent in this dispersion was distilled off at 50'C under a reduced pressure so that negatively chargeable black display particles having volume average particle size of 8.5 μm were obtained.

Production of White Display Particles

White Base Particles

The following resin and titanium oxide were loaded into a Henschel mixer (made by Mitsui Miike Mining Co., Ltd.) and a peripheral speed of stirring blades was set to 25 m/s so that a mixing process was carried out for five minutes to provide a mixture.

| | |
|---|---|
| Styrene acrylic resin (weight average molecular weight 20,000) | 100 parts by weight |
| Rutile type titanium oxide (R-630: made by Ishihara Sangyo Co., Ltd.) | 100 parts by weight |

The above-mentioned mixture was kneaded by a twin-screw extrusion kneader, coarsely pulverized by a hummer mill, then subjected to a grinding process by a turbo-mill grinder (made by Turbo Kogyo Co., Ltd.), and further subjected to a fine-particle classifying process by a gas-flow classifier utilizing a Coanda effect so that white base particles having a volume-average particle size of 8.0 μm were produced.

Metal Oxide Layer

The white base particles (30 g) were dispersed in 1000 g of pure water, and 10 g of ammonia water (28 wt %) was added thereto, and this was stirred for 5 minutes. Next, tetraethoxysilane (8.5 g) was dropped thereto in 3 hours, and this was stirred for 5 hours at room temperature. The resulting precipitate was filtrated, and after having been washed with pure water, this was dried at 60° C. for 24 hours so that white particles in which a silica fine particle layer (SiO$_2$ layer) was formed on the surface of each of the white base particles were obtained.

Organic Layer

To 25 g of an aqueous solution (1 wt %) of acetic acid was added 4 g of N-(2-aminoethyl)-3-aminopropyltriethoxysilane (first processing agent), and this was stirred at room temperature for 15 minutes. Thereafter, to the mixed solution were added 10 g of the resulting white particles, and this was stirred at 50° C. for 3 hours. The solvent in this dispersion was distilled off at 50° C. under a reduced pressure. Thereafter, the resulting white particles were added to a mixed solution of 50 g of cyclohexane and 10 g of hexamethyldisilazane (second processing agent), and this was heated at 50° C., while being stirred, so as to react with each other for 3 hours. Next, the solvent in this dispersion was distilled off at 50° C. under a reduced pressure so that positively chargeable white display particles having a volume average particle size of 8.3 μm were obtained.

Carrier A for Charging White Display Particles

To 100 parts by weight of ferrite cores having an average particle size of 80 μm were added 2 parts of fluoridated acrylate resin particles, and these materials were put into a horizontal rotation blade type mixer, and mixed and stirred at 22° C. for 10 minutes under a condition of 8 m/sec in the peripheral speed of the horizontal rotation blades. The resulting mixture was then heated to 90° C., and stirred for 40 minutes so that carrier A was prepared.

Carrier B for Charging Black Display Particles

To 100 parts by weight of ferrite cores having an average particle size of 80 μm were added 2 parts of cyclohexylmethacrylate resin particles, and these materials were put into a horizontal rotation blade type mixer, and mixed and stirred at 22° C. for 10 minutes under a condition of 8 m/sec in the peripheral speed of the horizontal rotation blades. The resulting mixture was then heated to 90° C., and stirred for 40 minutes so that carrier B was prepared.

Production of Image Display Apparatus

An image display apparatus was manufactured in accordance with the following method so as to have the same structure as that of FIG. 1(a) except that no insulating layer 16 was formed. Two sheets of glass substrates each having a length of 80 mm, a width of 50 mm and a thickness of 0.7 mm were prepared, and an electrode 15 made of an indium-tin oxide (ITO) film (resistance: 30Ω/□) having a thickness of 300 nm was formed on each of the substrate surfaces by using a vapor deposition method.

Each of the electrode surfaces of the substrates with electrodes was subjected to an atmospheric-pressure plasma treatment.

More specifically, by the use of a metal oxide layer forming device shown in FIG. 7, a silicon oxide layer (SiO$_2$ layer) was formed on the electrode surface of each of the two substrates by using tetraethoxysilane. At this time, as the dielectric member with which each of the electrodes of the forming device was coated, with regard to both of the opposed electrodes, alumina having a thickness of 1 mm in its thickness on one side obtained by a ceramic flame spray coating process was used. The gap of the electrodes after the coating process was set to 1 mm. The metal base member which was coated with the dielectric member had a stainless-made jacket specification having a cooling function by cooling water, and during the discharging process, the electrode temperature control was carried out by the cooling water.

The film-forming conditions are shown below. Each of raw material gases was heated so as to generate its vapor, and mixed and diluted with a discharge gas and a reaction gas that were preliminarily allowed to have residual heat so that the materials were not aggregated, and the mixed gas was then supplied to a discharge space.

(Film-Forming Conditions)

Discharge gas: N$_2$ gas

Reaction gas: 19% by volume of O$_2$ gas relative to all the gases.

Raw Material gas: 1.4% by volume of tetraethoxysilane (TEOS) relative to all the gases Film thickness: 50 nm Power-supply power on low frequency side (high-frequency power supply made by Sinfonia Technology Co., Ltd. (50 kHz)): 10 W/cm$^2$ Power-supply power on high frequency side (high-frequency power supply made by Pearl Kogyo Co., Ltd. (13.56 MHz)): 5 W/cm$^2$ Black display particles (1 g) and carrier B (9 g) were mixed by a shaker (YS-LD, made by Yayoi Co., Ltd.) for 30 minutes so that display particles were charged. The resulting mixtures (21, 210) were put on a conductive stage 100, as shown in FIG. 6(a), and one of the substrates with the metal oxide layer being formed on its electrode was disposed with a gap of about 2 mm being set from the stage 100. Between the electrode 15 and the stage 100, a DC bias of +50V and an AC bias of 2.0 kV were applied with a frequency of 2.0 kHz for 10 seconds so that negatively chargeable black display particles 21 were allowed to adhere to the substrate side.

White display particles (1 g) and carrier A (9 g) were mixed by a shaker (YS-LD, made by Yayoi Co., Ltd.) for 30 minutes so that display particles were charged. The resulting mixtures (22, 220) were put on a conductive stage 100, as shown in FIG. 6(b), and the other, substrate with the metal oxide layer being formed on its electrode was disposed with a gap of about 2 mm being set from the stage 100. Between the electrode 15 and the stage 100, a DC bias of −50V and an AC bias of 2.0 kV were applied with a frequency of 2.0 kHz for 10 seconds so that positively chargeable white display particles 22 were allowed to adhere to the substrate side.

As shown in FIG. 6(c), the substrate to which the black display particles were adhered and the substrate to which the white display particles were adhered were superposed so as to have a gap of 50 μm by making adjustments by ribs, and the peripheral portions of the substrates were bonded to each other with an epoxy-based adhesive so that an image display apparatus was prepared. The mixing rates of the white display particles and the black display particles were set so as to have the same weight respectively, and the volume-filling-ratio of the display particles between glass substrates was adjusted so as to be 50%.

Examples 2 to 4/Comparative Examples 1 to 7

An image display apparatus was manufactured by using the same method as that of Example 1, except that, upon production of the white display particles and the black display particles, predetermined raw materials and surface treating agents were used for forming the metal oxide layer 44 and the organic layer 45 and that, upon production of both of the substrates with electrodes, predetermined raw materials and surface treating agents were used for forming the metal oxide layer 1 and organic layer.

In Example 4, the organic layer was formed on the surface of the metal oxide layer 1 on each of the two substrates with electrodes by using the following method.

A hydrophobizing agent (hexamethyl disilazane) (10 parts by weight) and an organic solvent (cyclohexane) (90 parts by weight) were mixed to prepare a hydrophobizing agent solution. The surface of the metal oxide layer 1 was coated with the hydrophobizing agent solution, and after having been heated at 100° C. for 2 hours, this was dried so that an organic layer was formed.

In Comparative Example 1, on the electrode surface of each of the two substrates with electrodes, a silicone resin layer was formed by using the following method.

A resin (12 g) having a weight average molecular weight of 40,000 and serving as a silicone-based resin, shown below, was dissolved in 80 ml of tetrahydrofuran and 20 ml of toluene to prepare a coating solution, and this coating solution was applied onto ITO of the substrate by using a spin coating method so that an insulating layer having a film thickness of 3 μm after the drying process was formed thereon.

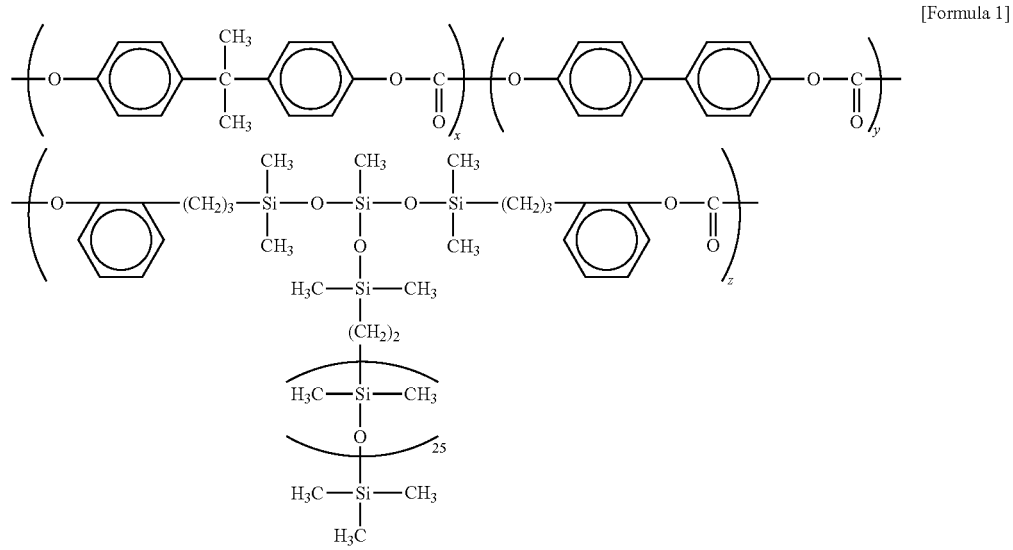

[Formula 1]

In Comparative Example 2, a polycarbonate resin layer was formed on the electrode surface of each of the two substrates with electrodes by using the following method.

A bisphenol z-type polycarbonate resin (12 g) was dissolved in 80 ml of tetrahydrofuran and 20 ml of toluene to prepare a coating solution. This coating solution was applied onto ITO of the substrate by using a spin coating method so that an insulating layer of a polycarbonate resin having a film thickness of 3 μm after the drying process was formed thereon.

TABLE 1

| | | Black particles | | | White particles | | |
| | | Metal oxide layer 44 | | | Metal oxide layer 44 | | |
| | Raw Material | Inorganic fine particles (average primary particle size: nm) | Thickness (nm) | Organic layer 45 Negatively chargeable surface treating agent/thickness (nm) | Raw Material | Inorganic fine particles (average primary particle size: nm) | Thickness (nm) | Organic layer 45 Positively chargeable surface treating agent (first treating agent/ second treating agent)/ thickness (nm) |
|---|---|---|---|---|---|---|---|---|
| Example 1 | Tetraethoxysilane | Silica; SiO$_2$ (85) | 90 | Hexamethyldisilazane/12 | Tetraethoxysilane | Silica; SiO$_2$ (89) | 96 | N-(2-aminoethyl)-3-aminopropyltriethoxysilane/ hexamethyldisilazane/15 |
| Example 2 | Aluminum triisopropoxide | Alumina; Al$_2$O$_3$ (78) | 88 | Hexamethyldisilazane/15 | Aluminum triisopropoxide | Alumina; Al$_2$O$_3$ (82) | 86 | N-(2-aminoethyl)-3-aminopropyltriethoxysilane/ hexamethyldisilazane/16 |
| Example 3 | Titanium tetraisopropoxide | Titania; TiO$_2$ (69) | 75 | Hexamethyldisilazane/14 | Titanium tetraisopropoxide | Titania; TiO$_2$ (88) | 95 | N-(2-aminoethyl)-3-aminopropyltriethoxysilane/ hexamethyldisilazane/17 |
| Example 4 | Tetraethoxysilane | Silica; SiO$_2$ (85) | 90 | Hexamethyldisilazane/12 | Tetraethoxysilane | Silica; SiO$_2$ (91) | 96 | N-(2-aminoethyl)-3-aminopropyltriethoxysilane/ hexamethyldisilazane/15 |

TABLE 2

| | Black particles | | | | White particles | | | |
|---|---|---|---|---|---|---|---|---|
| | | Metal oxide layer 44 | | | | Metal oxide layer 44 | | |
| | Raw Material | Inorganic fine particles (average primary particle size: nm) | Thickness (nm) | Organic layer 45 Negatively chargeable surface treating agent/thickness (nm) | Raw Material | Inorganic fine particles (average primary particle size: nm) | Thickness (nm) | Organic layer 45 Positively chargeable surface treating agent (first treating agent/second treating agent)/thickness (nm) |
| Comparative Example 1 | Tetraethoxysilane | Silica; SiO$_2$ (85) | 90 | Hexamethyldisilazane/12 | Tetraethoxysilane | Silica; SiO$_2$ (89) | 96 | N-(2-aminoethyl)-3-aminopropyltriethoxysilane/hexamethyldisilazane/15 |
| Comparative Example 2 | Tetraethoxysilane | Silica; SiO$_2$ (85) | 90 | Hexamethyldisilazane/12 | Tetraethoxysilane | Silica; SiO$_2$ (89) | 96 | N-(2-aminoethyl)-3-aminopropyltriethoxysilane/hexamethyldisilazane/15 |
| Comparative Example 3 | Tetraethoxysilane | Silica; SiO$_2$ (85) | 90 | Hexamethyldisilazane/12 | Tetraethoxysilane | Silica; SiO$_2$ (89) | 96 | N-(2-aminoethyl)-3-aminopropyltriethoxysilane/hexamethyldisilazane/15 |
| Comparative Example 4 | Tetraethoxysilane | Silica; SiO$_2$ (85) | 90 | Hexamethyldisilazane/12 | Aluminum triisopropoxide | Alumina; Al$_2$O$_3$ (82) | 86 | N-(2-aminoethyl)-3-aminopropyltriethoxysilane/hexamethyldisilazane/15 |
| Comparative Example 5 | Tetraethoxysilane | Silica; SiO$_2$ (85) | 90 | Hexamethyldisilazane/12 | Tetraethoxysilane | Silica; SiO$_2$ (89) | 96 | N-(2-aminoethyl)-3-aminopropyltriethoxysilane/hexamethyldisilazane/15 |
| Comparative Example 6 | Tetraethoxysilane | Silica; SiO$_2$ (85) | 90 | —[1]/0 | Tetraethoxysilane | Silica; SiO$_2$ (89) | 96 | N-(2-aminoethyl)-3-aminopropyltriethoxysilane/hexamethyldisilazane/15 |
| Comparative Example 7 | —[1] | —[1] | 0 | Hexamethyldisilazane/12 | Tetraethoxysilane | Silica; SiO$_2$ (89) | 96 | N-(2-aminoethyl)-3-aminopropyltriethoxysilane/hexamethyldisilazane/15 |

[1]Not formed

TABLE 3

| | Both of substrates | | | |
|---|---|---|---|---|
| | Metal oxide layer 1 | | | Organic layer |
| | Raw Material gas | Kind | Thickness (μm) | Hydrophobizing agent/thickness (nm) |
| Example 1 | Tetraethoxysilane | Silica; SiO$_2$ | 3.1 | —[1]/0 |
| Example 2 | Aluminum triisopropoxide | Alumina; Al$_2$O$_3$ | 3.3 | —[1]/0 |
| Example 3 | Titanium tetraisopropoxide | Titania; TiO$_2$ | 0.8 | —[1]/0 |
| Example 4 | Tetraethoxysilane | Silica; SiO$_2$ | 3.1 | hexamethyldisilazane/22 |
| Comparative Example 1 | — | Silicone resin | 3.0 | —[1]/0 |
| Comparative Example 2 | — | Polycarbonate resin | 3.0 | —[1]/0 |
| Comparative Example 3 | Aluminum triisopropoxide | Alumina; Al$_2$O$_3$ | 3.3 | —[1]/0 |
| Comparative Example 4 | Tetraethoxysilane | Silica; SiO$_2$ | 3.1 | —[1]/0 |
| Comparative Example 5[2] | Tetraethoxysilane Aluminum triisopropoxide | Silica; SiO$_2$ Alumina; Al$_2$O$_3$ | 3.1 3.3 | —[1]/0 —[1]/0 |
| Comparative Example 6 | Tetraethoxysilane | Silica; SiO$_2$ | 3.1 | —[1]/0 |
| Comparative Example 7 | Tetraethoxysilane | Silica; SiO$_2$ | 3.1 | —[1]/0 |

[1]Not formed
[2]In Comparative Example 5, different metal oxide layers were formed between one of the substrates and the other substrate.

Evaluation

A DC voltage was applied to the image display apparatus in the following processes under a low temperature-low humidity environment (10° C., 20%), and by measuring the reflection density of a display image obtained by the voltage application, the display characteristic was evaluated. Additionally, the voltage application was carried out by the following processes in which the voltage is applied in a manner so as to follow a hysteresis curve of a course in which, after the applied voltage has been changed from 0V to the plus side, it is successively changed to the minus side, and then again returned to 0V. That is:

(1) The voltage application is carried out with the voltage being changed from 0V to +100V with 20V intervals.

(2) The voltage application is carried out with the voltage being changed from +100V to −100V with 20V intervals.
(3) The voltage application is carried out with the voltage being changed from −100V to 0V with 20V intervals.

When a DC voltage was applied to each of the image display apparatuses in the above-mentioned processes, it was confirmed that, upon application of a plus voltage in a state of white display, the display was changed from white to black. Additionally, the voltage to be applied to the electrode on the upstream side in the visually recognizable direction of the image display apparatus was changed, with the other electrode being electrically earthed.

The contrast was evaluated as a display characteristic, and a repeating characteristic was further evaluated.

Contrast (Initial)

The contrast was evaluated based upon a difference between the black color density and the white color density, that is, based upon the density difference defined by the following equation:

Contrast=black color density−white color density

The black color density was a reflection density of the display surface obtained upon application of a voltage of +100 V to the electrode on the upstream side in the visually recognizable direction of the image display apparatus.

The white color density was a reflection density of the display surface obtained upon application of a voltage of −100 V to the electrode on the upstream side in the visually recognizable direction of the image display apparatus.

Densities at five points on the display surface were randomly measured by using a reflection densitometer "RD918 (made by Macbeth Process Measurements Co.)", and the density was given as the average value of these.

The contrast was evaluated based upon the following criteria: having 1.30 or more in the density difference was rated as the most superior (⊙); having 1.20 or more was rated as superior (○); having 1.00 or more was rated as acceptable (Δ) and having less than 1.00 was rated as rejected (x).

Contrast (After Repetitive Operations)

The repetitive characteristic was evaluated in the following manner: voltage applications of +100 V and −100 V were alternately repeated, and at the time when, upon measuring the reflection density each time, the contrast became 0.70 or less, the repetitive characteristic was evaluated based upon the number of repetition times at this time. The repetitive characteristic was evaluated based upon the following criteria: the repetition times of 10000 or more was rated as the most superior (⊙); the repetition times of 5000 or more was rated as superior (○); the repetition times of 1000 or more was rated as acceptable (Δ) and the repetition times of less than 1000 was rated as rejected (x).

TABLE 4

| | Contrast under a low temperature-low humidity environment | |
|---|---|---|
| | Initial | After repetitive operations |
| Example 1 | ⊙ | ○ |
| Example 2 | ⊙ | Δ |
| Example 3 | ⊙ | Δ |
| Example 4 | ⊙ | ○ |
| Comparative Example 1 | ⊙ | X |
| Comparative Example 2 | ⊙ | X |
| Comparative Example 3 | ⊙ | X |
| Comparative Example 4 | ⊙ | X |
| Comparative Example 5 | ⊙ | X |
| Comparative Example 6 | X | X |
| Comparative Example 7 | X | X |

EFFECTS OF THE INVENTION

In accordance with the present invention, it is possible to sufficiently prevent degradation of contrast at the time of repetitive driving operations, for a long period of time, even under a low temperature-low humidity environment.

REFERENCE NUMERALS

1: Metal Oxide Layer
10: Image Display Apparatus
11: 12: Substrate
15: Electrode
16: Insulating Layer
17: Barrier Rib
18: Gap
18a: Image Display Surface
21: Black Display Particle
22: White Display Particle
41: Resin
42: Colorant
43: Base Particle
44: Metal Oxide Layer
45: Organic Layer

What is claimed is:

1. An image display apparatus comprising:
two substrates at least one of which is transparent; and
display particles that are sealed between the substrates in a powder state so that by generating an electric field between the substrates, the display particles are moved to display an image,
wherein, of contact surfaces with the display particles in a gap between the substrates, both of the surfaces on the substrate sides have oxide layers of the same metal, and
the display particles include positively chargeable display particles and negatively chargeable display particles, both of the positively chargeable display particles and the negatively chargeable display particles have structures obtained by successively forming oxide layers of the same metal as that of the metal oxide layers possessed by the surfaces on the substrate sides and organic layers on the surfaces of base particles that contain at least a resin and a colorant, and a mixing ratio between the positively chargeable display particles and the negatively chargeable display particles is 1/3 to 3/1 in weight ratio.

2. The image display apparatus of claim 1, wherein both of the surfaces on the substrate sides are further provided with organic layers on the metal oxide layers.

3. The image display apparatus of claim 1, wherein a raw material for the metal oxide layers is selected from those materials that achieve a visible light transmittance of 80% or more, when formed into a metal oxide layer.

4. The image display apparatus of claim 1, wherein the metal oxide is silicon oxide.

5. The image display apparatus of claim 1, wherein the metal oxide is $SiO_2$.

6. The image display apparatus of claim 1, wherein the metal oxide is titanium oxide.

7. The image display apparatus of claim 1, wherein the metal oxide is selected from $Ti_2O_5$, $Ti_2O_3$, $TiO_2$, or $Ti_nO_{2n-1}$, (n: an integer of 4 to 9).

8. The image display apparatus of claim 1, wherein the metal oxide is $TiO_2$.

9. The image display apparatus of claim 1, wherein the metal oxide is aluminum oxide.

10. The image display apparatus of claim 1, wherein the metal oxide is $Al_2O_3$.

11. The image display apparatus of claim 1, wherein the metal oxide layers possessed by the surfaces on the substrate sides have a thickness of 0.01 to 10.0 μm.

12. The image display apparatus of claim 1, wherein a mixing ratio between the positively chargeable display particles and the negatively chargeable display particles is 1/2 to 2/1 in weight ratio.

13. The image display apparatus of claim 1, wherein a thickness of the gap is in the range from 10 μm to 500 μm.

14. The image display apparatus of claim 1, wherein a volume-filling-ratio of the display particles within the gap is 5% to 70%.

15. The image display apparatus of claim 1, wherein thicknesses of the substrates are respectively 2 μm to 5 mm.

16. The image display apparatus of claim 1, wherein thicknesses of the substrates are respectively 5 μm to 2 mm.

17. The image display apparatus of claim 1, wherein the metal oxide layers possessed by the surfaces on the substrate sides are formed by an atmospheric-pressure plasma processing method.

18. The image display apparatus of claim 1, wherein the organic layers of the positively chargeable display particles are formed by using N-(2-aminoethyl)-3-aminopropyltriethoxysilane as a positively chargeable organic silicon compound.

19. The image display apparatus of claim 1, wherein the organic layers of the negatively chargeable display particles are formed by using hexamethyldisilazane as a negatively chargeable organic silicon compound.

* * * * *